(12) United States Patent
Horiuchi

(10) Patent No.: US 12,155,293 B2
(45) Date of Patent: Nov. 26, 2024

(54) HAPTIC SENSATION PRESENTING DEVICE AND HOLDING DEVICE

(71) Applicant: SONY GROUP CORPORATION, Tokyo (JP)

(72) Inventor: Yuya Horiuchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 144 days.

(21) Appl. No.: 17/906,208

(22) PCT Filed: Mar. 11, 2021

(86) PCT No.: PCT/JP2021/009730
§ 371 (c)(1),
(2) Date: Sep. 13, 2022

(87) PCT Pub. No.: WO2021/193083
PCT Pub. Date: Sep. 30, 2021

(65) Prior Publication Data
US 2023/0118358 A1    Apr. 20, 2023

(30) Foreign Application Priority Data

Mar. 25, 2020   (JP) ................................. 2020-054459

(51) Int. Cl.
*H02K 7/14* (2006.01)
*B06B 1/04* (2006.01)
(Continued)

(52) U.S. Cl.
CPC ................. *H02K 7/14* (2013.01); *B06B 1/04* (2013.01); *B25J 15/0033* (2013.01); *H02K 5/04* (2013.01)

(58) Field of Classification Search
CPC ... G06F 3/00; G06F 3/01; G06F 3/016; G06F 3/03; G06F 3/035; G06F 3/0354;
(Continued)

(56) References Cited

U.S. PATENT DOCUMENTS

2016/0299602 A1   10/2016   Shuster et al.

FOREIGN PATENT DOCUMENTS

| FR | 2966613 A1 * | 4/2012 | ............... H02K 7/14 |
| JP | 2011-090628 A | 5/2011 | |
| JP | 2019-133273 A | 8/2019 | |

OTHER PUBLICATIONS

International Search Report and Written Opinion of PCT Application No. PCT/JP2021/009730, issued on May 18, 2021, 10 pages of ISRWO.

(Continued)

*Primary Examiner* — Tran N Nguyen

(57) ABSTRACT

A haptic sensation presenting device and a holding device that are capable of presenting a variety of haptic sensations with a simple mechanism; the haptic sensation presenting device according to the present technology includes: a casing; a film; and a flat plate member; wherein the casing has an opening such that the film closes the opening; the flat plate member has a main surface parallel to an opening surface of the opening, and is supported by the casing so as to be movable between a first position at which the main surface is located on the same surface as the opening surface and a second position at which the main surface is separated from the opening surface in a direction opposite to the film.

20 Claims, 41 Drawing Sheets

(51) Int. Cl.
*B25J 15/00* (2006.01)
*H02K 5/04* (2006.01)

(58) Field of Classification Search
CPC ........ G06F 3/04; G06F 3/041; G06F 3/04144;
G06F 3/048; G06F 3/0482; G06F 3/0488;
H02K 5/04; H02K 7/14; A63F 13/24;
A63F 13/285; B25J 15/00; B25J 15/003;
B25J 15/0033; B06B 1/04; H04L 67/10
See application file for complete search history.

(56) References Cited

OTHER PUBLICATIONS

Fujita, et al., "A New Softness Display Interface by Dynamic Fingertip Contact Area Control", ITE Technical Report, vol. 24, No. 35, Jun. 14, 2000, 5 pages.
Tsugami, et al., "Development of parallel gripper using reformed MR fluid", Preprints of the 34th Annual Conference of the Robotics Society of Japan, the Robotics Society of Japan, Sep. 7, 2016, pp. 1305-1308.

* cited by examiner

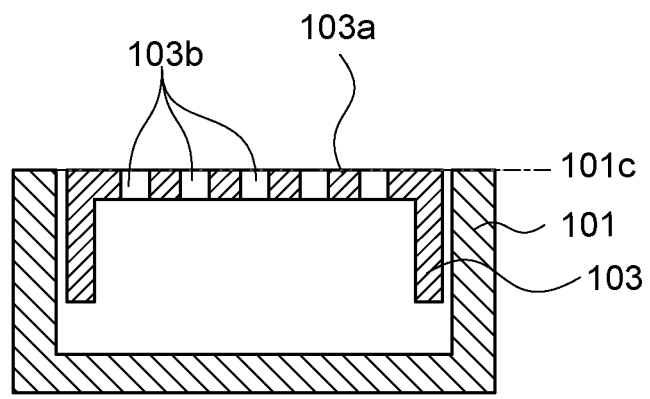
FIG. 19A
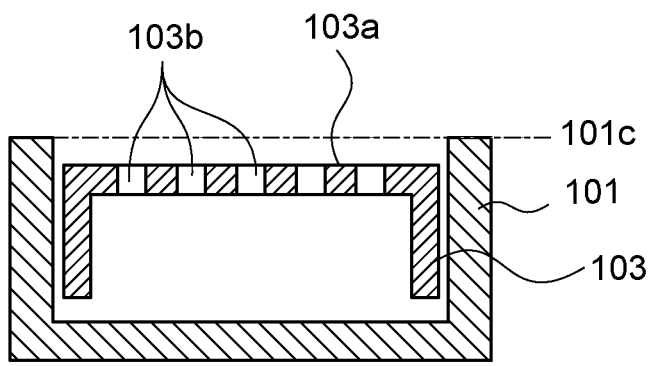
FIG. 19B
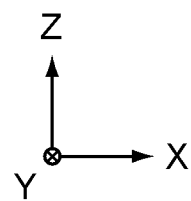

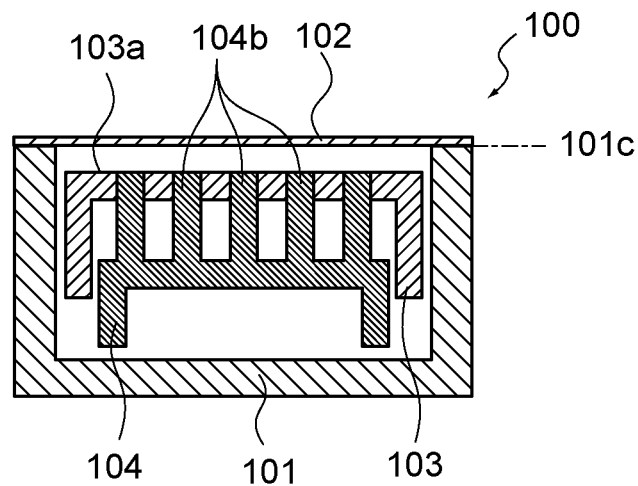
FIG. 34A
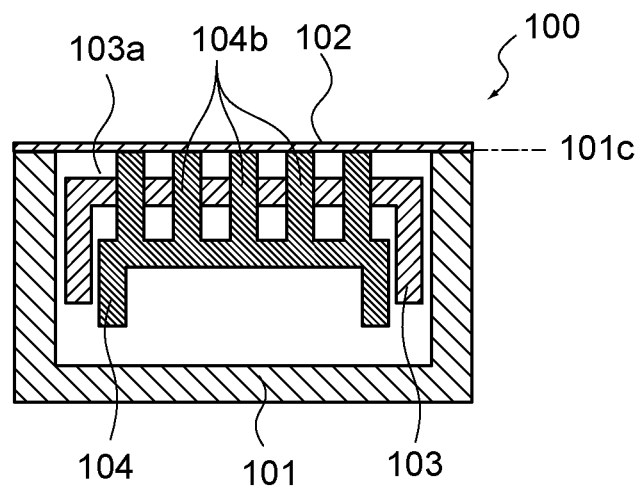
FIG. 34B
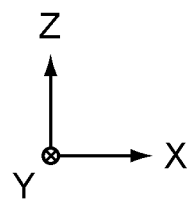

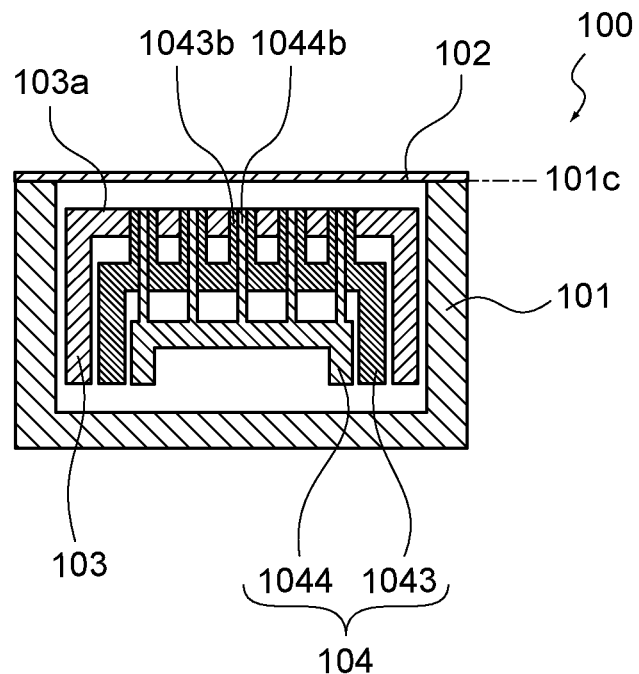
FIG. 44A
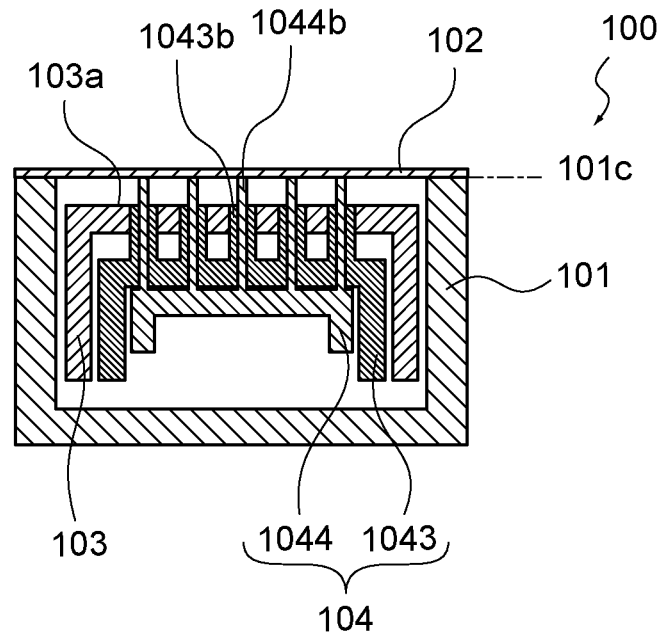
FIG. 44B
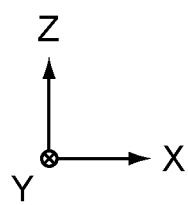

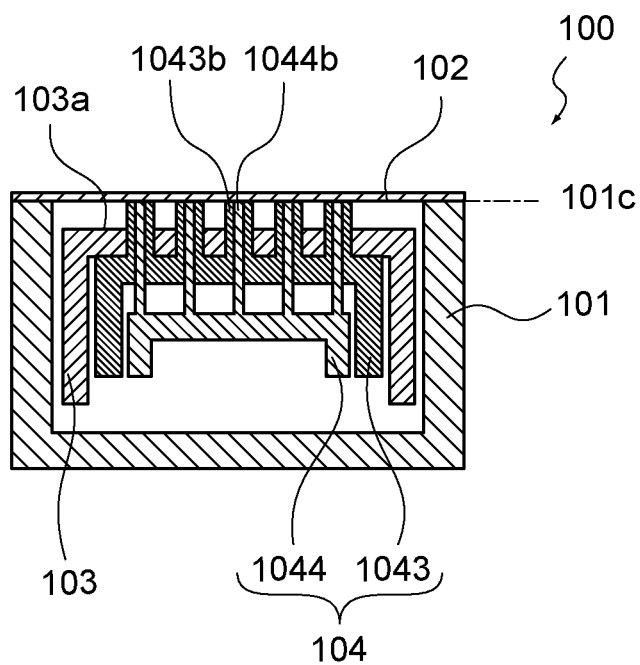
FIG. 45A
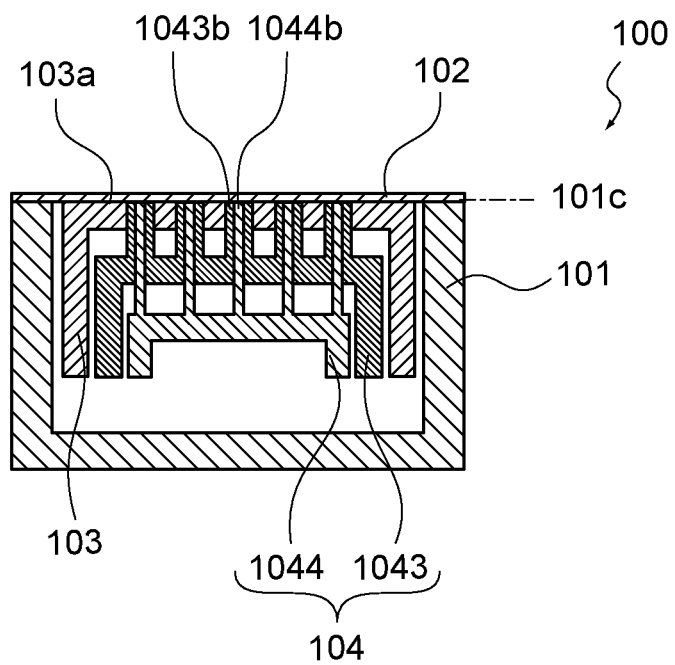
FIG. 45B
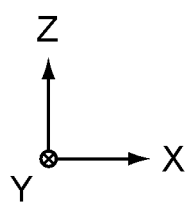

HAPTIC SENSATION PRESENTING DEVICE AND HOLDING DEVICE

CROSS REFERENCE TO RELATED APPLICATIONS

This application is a U.S. National Phase of International Patent Application No. PCT/JP2021/009730 filed on Mar. 11, 2021, which claims priority benefit of Japanese Patent Application No. JP 2020-054459 filed in the Japan Patent Office on Mar. 25, 2020. Each of the above-referenced applications is hereby incorporated herein by reference in its entirety.

TECHNICAL FIELD

The present technology relates to a haptic sensation presenting device and a holding device that are capable of changing a haptic sensation.

BACKGROUND ART

A haptic sensation presenting device capable of changing a haptic sensation on a contacted surface is being used in various fields. For example, Patent Literature 1 discloses an operation device including an operation surface with which a finger of a user comes into contact and a plurality of haptic sensation presenters capable of protruding from the operation surface. This operation device is configured to be capable of causing the haptic sensation presenter to protrude from the operation surface to come into contact with the finger and feeding back an input operation by a user.

CITATION LIST

Patent Literature

Patent Literature 1: Japanese Patent Application Laid-open No. 2019-133273

DISCLOSURE OF INVENTION

Technical Problem

However, in the configuration of Patent Literature 1, since a haptic sensation is changed by the position or the amount of protrusion of the haptic sensation presenter, a variety of haptic sensations such as changing the flexibility of the operation surface cannot be presented. Further, in the configuration of Patent Literature 1, it is necessary to drive each of a large number of haptic sensation presenters, which requires a complicated mechanism.

In view of the circumstances as described above, it is an object of the present technology to provide a haptic sensation presenting device and a holding device that are capable of presenting a variety of haptic sensations with a simple mechanism.

Solution to Problem

In order to achieve the above-mentioned object, a haptic sensation presenting device according to an embodiment of the present technology includes: a casing, a film, and a flat plate member.

The casing has an opening.
The film closes the opening.
The flat plate member has a main surface parallel to an opening surface of the opening, and is supported by the casing so as to be movable between a first position at which the main surface is located on the same surface as the opening surface and a second position at which the main surface is separated from the opening surface in a direction opposite to the film.

The flat plate member may include a plurality of through holes provided on the main surface, and
the haptic sensation presenting device may further include a recessed and projecting member that includes a plurality of protruding portions to be inserted from a side opposite to the film into the plurality of through holes and is supported by the casing so as to be movable relative to the casing independently of the flat plate member.

The recessed and projecting member may be movable between a third position at which tips of the plurality of protruding portions are located on the same surface as the opening surface and a fourth position at which the tips of the plurality of protruding portions are separated from the opening surface in a direction opposite to the film.

The haptic sensation presenting device may take a first state in which the flat plate member is located at the second position and the recessed and projecting member is located at the fourth position, a second state in which the flat plate member is located at the second position and the recessed and projecting member is located at the third position, and a third state in which the flat plate member is located at the first position and the recessed and projecting member is located at the third position.

The haptic sensation presenting device may further include an annular rotation member that is rotatably supported by the casing, has a direction perpendicular to the opening surface as a rotation axis direction, and independently moves, by rotating, the flat plate member and the recessed and projecting member in a direction perpendicular to the opening surface to form the first state, the second state, and the third state.

The flat plate member may include a cylindrical first side wall portion that extends in a direction perpendicular to the main surface from a peripheral edge of the main surface,
the recessed and projecting member may include a support surface that is disposed parallel to the main surface, the plurality of protruding portions being provided on the support surface, and a cylindrical second side wall portion that extends in a direction perpendicular to the support surface from a peripheral edge of the support surface and is located on an inner circumference of the first side wall portion, and
the rotation member may rotate while abutting on the first side wall portion and the second side wall portion.

The first side wall portion may include a first inclined portion whose height from the main surface gradually increases,
the second side wall portion may include a second inclined portion whose height from the support surface gradually increase, and
the rotation member may include a third inclined portion that abuts on the first inclined portion by rotation of the rotation member to move the flat plate member and abuts on the second inclined portion by rotation of the rotation member to move the recessed and projecting member.

The first inclined portion and the second inclined portion may be provided at different positions on a circumference of the rotation member as viewed from a direction perpendicular to the opening surface, and the third inclined portion may abut on only one of the first inclined portion and the second inclined portion in accordance with a rotation angle of the rotation member.

The flat plate member may include a first protrusion that is provided on the first side wall portion, fits into a rail provided on the casing, guides movement of the flat plate member between the first position and the second position, and prevents the flat plate member from rotating, and the recessed and projecting member may include a second protrusion that is provided on the second side wall portion, fits into a rail provided on the casing, guides movement of the recessed and projecting member between the third position and the fourth position, and prevents the recessed and projecting member from rotating.

The haptic sensation presenting device may further include:

a first spring that is provided between the first protrusion and the casing, is compressed when the flat plate member moves from the second position to the first position by rotation of the rotation member, and moves the flat plate member from the first position to the second position when the rotation member further rotates; and a second spring that is provided between the second protrusion and the casing, is compressed when the recessed and projecting member moves from the fourth position to the third position by rotation of the rotation member, and moves the recessed and projecting member from the third position to the fourth position when the rotation member further rotates.

The rotation member may include a plurality of recessions and projections on an inner circumference side, and the haptic sensation presenting device may further includes:

a sensor that measures the number of times that the plurality of recessions and projections have passed by rotation of the rotation member;

a motor that causes the rotation member to rotate; and a control unit that controls rotation of the motor on a basis of an output of the sensor.

The haptic sensation presenting device may further include:

a motor that causes the rotation member to rotate; and a control unit that controls rotation of the motor, in which the control unit may cause the motor to rotate in a continuous manner to vibrate the flat plate member and the recessed and projecting member.

The control unit may dynamically change vibration frequencies of the flat plate member and the recessed and projecting member by changing a rotation speed of the motor.

The film may have stretchability, and the haptic sensation presenting device may further include a pump that pressurizes an inside of the casing and expands the film.

The film may have stretchability, and the haptic sensation presenting device may further include a piston ring that seals a space between the film, the casing, the flat plate member, and the recessed and projecting member, in which the film may be expanded by movement of the flat plate member and the recessed and projecting member.

The haptic sensation presenting device may further include an active valve that is capable of exhausting the space, in which whether or not to expand the film by movement of the flat plate member and the recessed and projecting member may be switched by opening and closing of the active valve.

The film may have stretchability and be located on the opening surface in the first state, the second state, and the third state, and the haptic sensation presenting device may further take a fourth state in which the film is expanded.

The film may have stretchability, and the haptic sensation presenting device may further include a piston ring that seals a space between the film, the casing, and the flat plate member, in which the film may be expanded by movement of the flat plate member.

The haptic sensation presenting device may take a first state in which the flat plate member is located at the first position and the film is located on the opening surface, a second state in which the flat plate member is located at the second position and the film is located on the opening surface, and a third state in which the film is expanded.

In order to achieve the above-mentioned object, a holding device according to an embodiment of the present technology includes: a casing; a film; and a flat plate member.

The casing has an opening.

The film closes the opening.

The flat plate member has a main surface parallel to an opening surface of the opening, and is supported by the casing so as to be movable between a first position at which the main surface is located on the same surface as the opening surface and a second position at which the main surface is separated from the opening surface in a direction opposite to the film.

BRIEF DESCRIPTION OF DRAWINGS

FIGS. 19A and 19B are schematic cross-sectional views showing a position of the flat plate member included in the haptic sensation presenting device.

FIGS. 34A and 34B are schematic cross-sectional views showing further movement of the recessed and projecting member of the haptic sensation presenting device.

FIGS. 44A and 44B are schematic cross-sectional views showing an operation of the haptic sensation presenting device.

FIGS. 45A and 45B are schematic cross-sectional view showing an operation of the haptic sensation presenting device.

MODE(S) FOR CARRYING OUT THE INVENTION

A haptic sensation presenting device according to an embodiment of the present technology will be described.

Structure of Haptic Sensation Presenting Device

Figure 1:
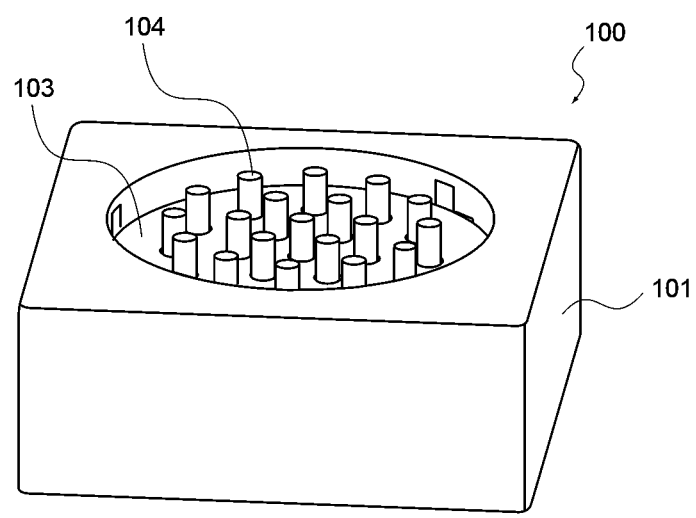
FIG. 1 is a perspective view of a haptic sensation presenting device according to an embodiment of the present technology.
Figure 1:
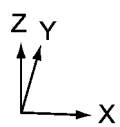
Figure 2:
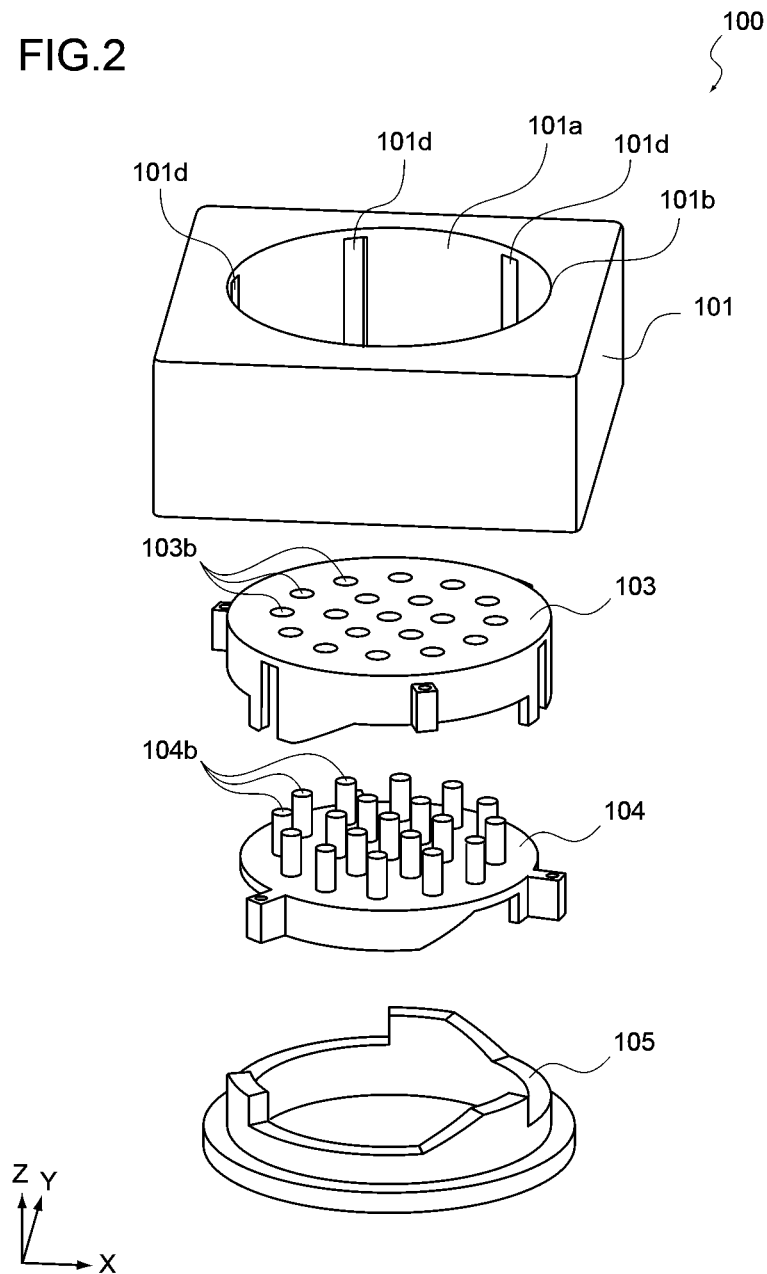
FIG. 2 is an exploded perspective view of the haptic sensation presenting device.
Figure 3:
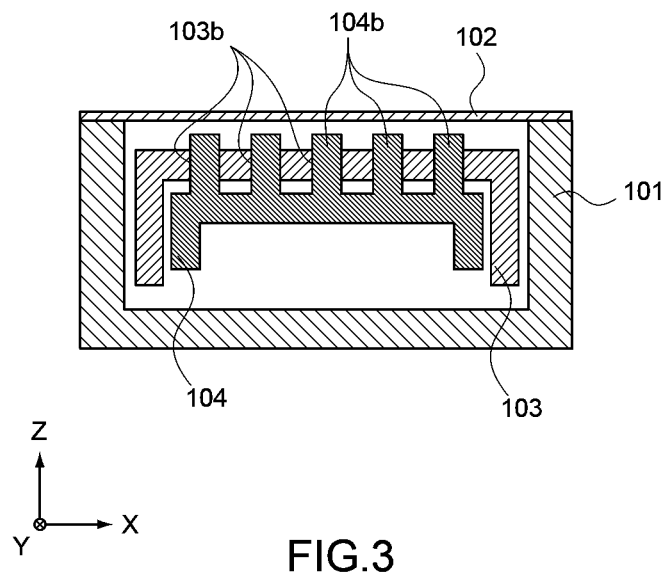
FIG. 3 is a schematic cross-sectional view of the haptic sensation presenting device.

FIG. 1 is a perspective view of a haptic sensation presenting device 100 according to this embodiment. FIG. 2 is an exploded perspective view of the haptic sensation presenting device 100. FIG. 3 is a schematic cross-sectional view of the haptic sensation presenting device 100. As shown in these figures, the haptic sensation presenting device 100 includes a casing 101, a film 102, a flat plate member 103, a recessed and projecting member 104, and a rotation member 105. Note that illustration of the film 102 is omitted in FIG. 1 and FIG. 2 and illustration of the rotation member 105 is omitted in FIG. 3.

Figure 4:
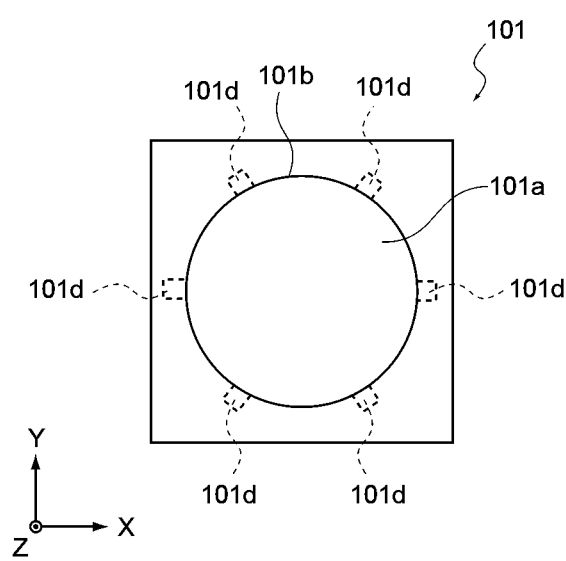
FIG. 4 is a plan view of a casing included in the haptic sensation presenting device.
Figure 5:
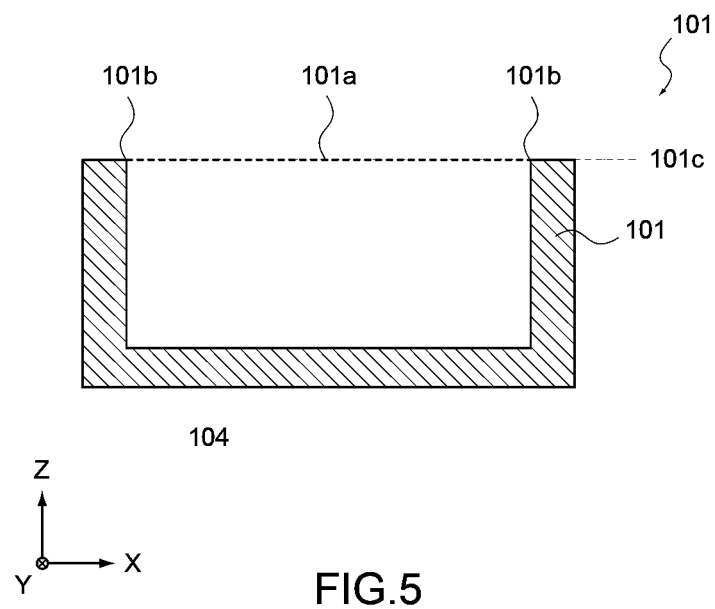
FIG. 5 is a schematic cross-sectional of the casing included in the haptic sensation presenting device.

The casing 101 houses the flat plate member 103, the recessed and projecting member 104, and the rotation member 105 and supports the film 102. FIG. 4 is a plan view of the casing 101 and FIG. 5 is a cross-sectional view of the casing 101. As shown in FIG. 4 and FIG. 5, the casing 101 has an opening 101a. The opening 101a can be circular but may have another shape such as a rectangle. Further, the peripheral edge of the opening 101a is defined as a peripheral edge 101b, and a virtual surface connecting the peripheral edge 101b is defined as an opening surface 101c.

Note that in each drawing in the present disclosure, one direction parallel to the opening surface 101c is defined as an X direction, and a direction that is parallel to the opening surface 101c and perpendicular to the X direction is defined as a Y direction. Further, a direction perpendicular to the X direction and the Y direction is defined as a Z direction. As shown in FIG. 2 and FIG. 4, a rail 101d is provided inside the opening 101a. The rail 101d has a groove shape extending along the Z direction and includes six rails provided at equal intervals.

The film 102 is joined around the peripheral edge 101b of the casing 101 and closes the opening 101a. The film 102 is formed of a material such as cloth and a resin film and has at least flexibility. Further, it is suitable that the film 102 is formed of a material such as rubber and an elastomer and has stretchability.

Figure 6:
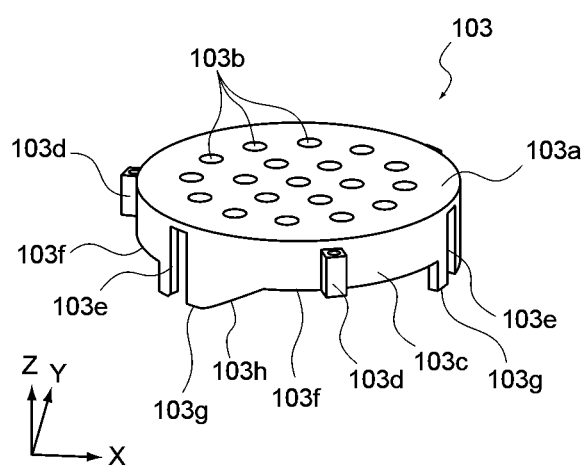
FIG. 6 is a perspective view of a flat plate member included in the haptic sensation presenting device.
Figure 7:
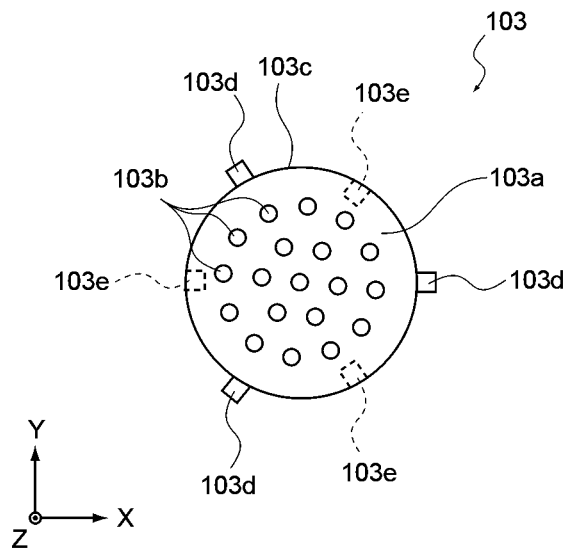
FIG. 7 is a plan view of the flat plate member included in the haptic sensation presenting device.

As shown in FIG. 3, the flat plate member 103 is housed in the casing 101 and supported so as to be movable relative to the casing 101. FIG. 6 is a perspective view of the flat plate member 103, and FIG. 7 is a plan view of the flat plate member 103. As shown in these figures, the flat plate member 103 includes a main surface 103a, a through hole 103b, a side wall portion 103c, a protruding portion 103d, and a notch 103e.

The main surface 103a is a surface parallel to the X-Y plane and has a shape that matches the opening 101a. The through hole 103b is a hole penetrating the main surface 103a and includes a plurality of holes provided in the main surface 103a. The side wall portion 103c is a cylindrical wall-shaped portion that extends in a direction perpendicular to the main surface 103a from the peripheral edge of the main surface 103a.

The height of the side wall portion 103c is not uniform, and the side wall portion 103c includes a low wall portion 103f having a low height from the main surface 103a, a high wall portion 103g having a high height from the main surface 103a, and an inclined portion 103h between the low wall portion 103f and the high wall portion 103g. As shown in FIG. 6, the inclined portion 103h is an inclined portion where the height from the main surface 103a gradually increases. Three low wall portions 103f, three high wall portions 103g, and three inclined portions 103h can be provided at equal intervals in the side wall portion 103c.

The protruding portion 103d is a protrusion that protrudes from the side wall portion 103c in the outer peripheral direction, and includes a plurality of protruding portions provided at predetermined intervals around the side wall portion 103c. The notch 103e a notch that is provided in the side wall portion 103c and extends in the Z direction, and includes a plurality of notches provided at predetermined intervals around the side wall portion 103c.

The protruding portion 103d and the notch 103e are provided at different positions in the side wall portion 103c, and three protruding portions 103d and three notches 103e can be provided at equal intervals as shown in FIG. 7. Further, four or more protruding portions 103d and four or more notches 103e may be provided.

Figure 8:
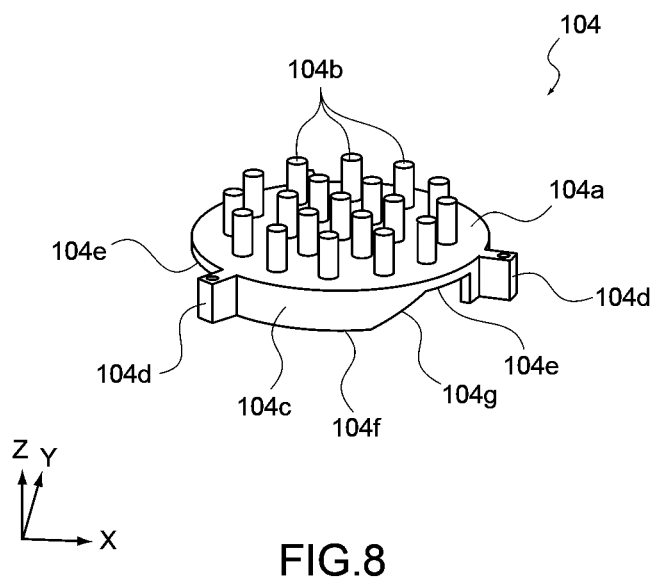
FIG. 8 is a perspective view of a recessed and projecting member included in the haptic sensation presenting device.
Figure 9:
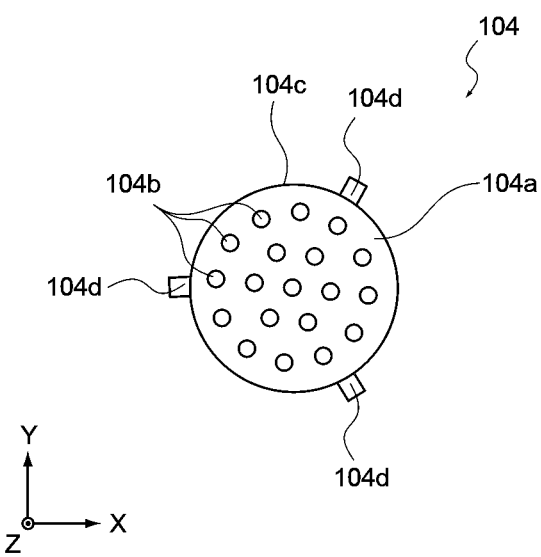
FIG. 9 is a plan view of the recessed and projecting member included in the haptic sensation presenting device.

As shown in FIG. 3, the recessed and projecting member 104 is disposed inside the flat plate member 103 and supported by the casing 101 so as to be movable independently of the flat plate member 103. FIG. 8 is a perspective view of the recessed and projecting member 104, and FIG. 9 is a plan view of the recessed and projecting member 104. As shown in these figures, the recessed and projecting member 104 includes a support surface 104a, a protruding portion 104b, a side wall portion 104c, and a protruding portion 104d.

The support surface 104a is a surface parallel to the X-Y plane, and has a shape that can be housed in the side wall portion 103c of the flat plate member 103 as shown in FIG. 3. The protruding portion 104b is a rod-shaped portion that protrudes from the support surface 104a in the Z direction, and includes a plurality of protruding portions. A tip of the protruding portion 104b can have a flat shape, but may have a hemispherical shape or the like. As shown in FIG. 3, the protruding portions 104b are configured to be able to be inserted from the side opposite to the film 102 into the respective through holes 103b of the flat plate member 103.

The side wall portion 104c is a cylindrical wall-shaped portion that extends from the peripheral edge of the support surface 104a in a direction perpendicular to the support surface 104a. The height of the side wall portion 104c is not uniform, and the side wall portion 104c includes a low wall portion 104e having a low height from the support surface 104a, a high wall portion 104f having a high Neigh from the support surface 104a, and an inclined portion 104g located between the low wall portion 104e and the high wall portion 104f. As shown in FIG. 8, the inclined portion 104g is an inclined portion where the height from the support surface 104a gradually increases. Three low wall portions 104e, three high wall portions 104f, and three inclined portions 104g can be provided at equal intervals in the side wall portion 104c.

The protruding portion 104d is a protrusion that protrudes from the side wall portion 104c in the outer peripheral direction, and includes a plurality of protruding portions provided at predetermined intervals around the side wall portion 104c. The protruding portions 104d are provided at different positions in the side wall portion 104c, and three protruding portions 104d can be provided at equal intervals as shown in FIG. 9. Further, four or more protruding portions 104d may be provided.

The rotation member 105 is an annular member that is supported by the casing 101 so as to be movable with a direction (Z direction) perpendicular to the opening surface 101c as a rotation axis direction, and moves, by rotating, the flat plate member 103 and the recessed and projecting member 104 in a direction (Z direction) perpendicular to the opening surface 101c. The rotation member 105 is sandwiched by a lid or the like on the bottom surface of the casing 101 and rotatably supported by the casing 101 such that the position thereof does not move.

Figure 10:
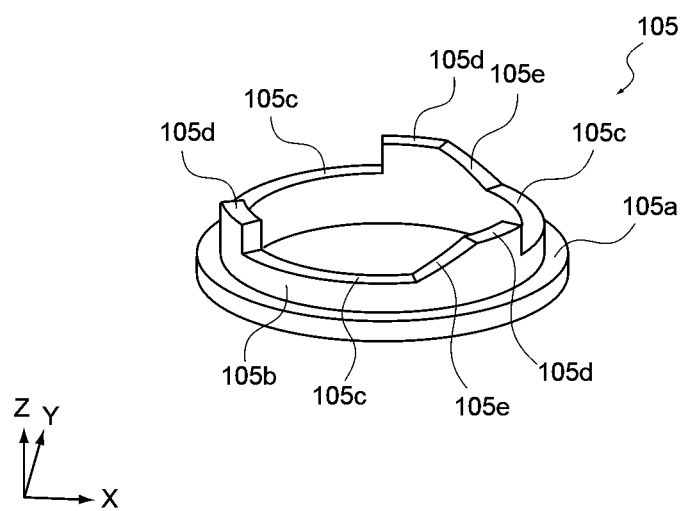
FIG. 10 is a perspective view of a rotation member included in the haptic sensation presenting device.
Figure 11:
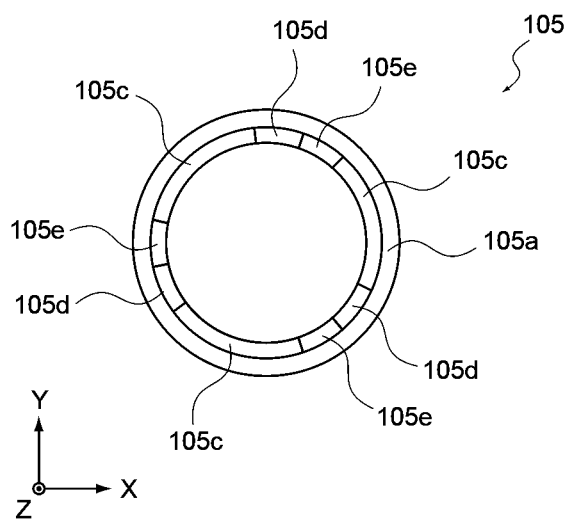
FIG. 11 is a plan view of the rotation member included in the haptic sensation presenting device.

FIG. 10 is a perspective view of the rotation member 105, and FIG. 11 is a plan view of the rotation member 105. As shown in these figures, the rotation member 105 includes a base portion 105a and a side wall portion 105b. The base portion 105a has an annular shape along the X-Y plane and the side wall portion 105b has a cylindrical shape with a rotation axis direction (Z direction) as a central axis.

The height of the side wall portion 105b from the base portion 105a is not uniform, and the side wall portion 105b includes a low wall portion 105c having a low height from the base portion 105a, a high wall portion 105d having a high height from the base portion 105a, and an inclined portion 105e located between the low wall portion 105c and the high wall portion 105d. As shown in FIG. 10, the inclined portion 105e is an inclined portion where the height from the base portion 105a gradually increases. Three low wall portions 105c, three high wall portions 105d, and three inclined portions 105e can be provided at equal intervals in the side wall portion 105b.

Figure 12:
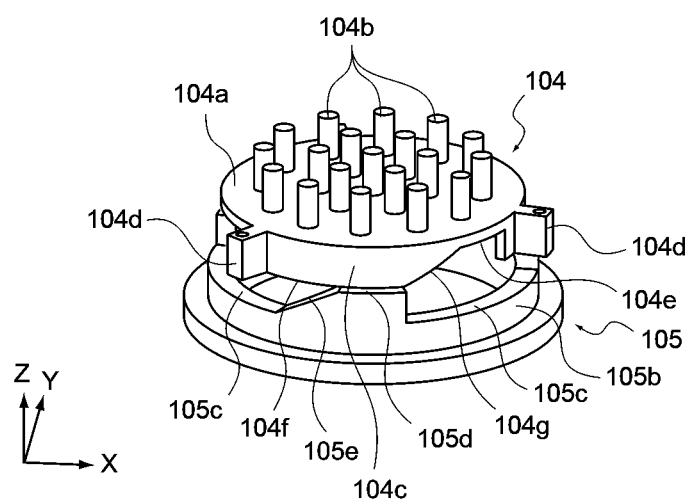
FIG. 12 is a perspective view of the recessed and projecting member included in the haptic sensation presenting device, and a rotation member.

FIG. 12 is a perspective view showing the state in which the rotation member 105 and the recessed and projecting member 104 are connected to each other. As shown in the figure, the rotation member 105 and the recessed and projecting member 104 are disposed such that the side wall portion 105b and the side wall portion 104c abut on each other. Although the state in which the high wall portion 105d and the high wall portion 104f abut on each other is shown in FIG. 12, the abutting portion changes due to rotation of the rotation member 105 as will be described below. As shown in FIG. 12, the rotation member 105 and the recessed and projecting member 104 are disposed such that the side wall portion 104c abuts on the half region of the end surface of the side wall portion 105b on the inner circumference side.

Figure 13:
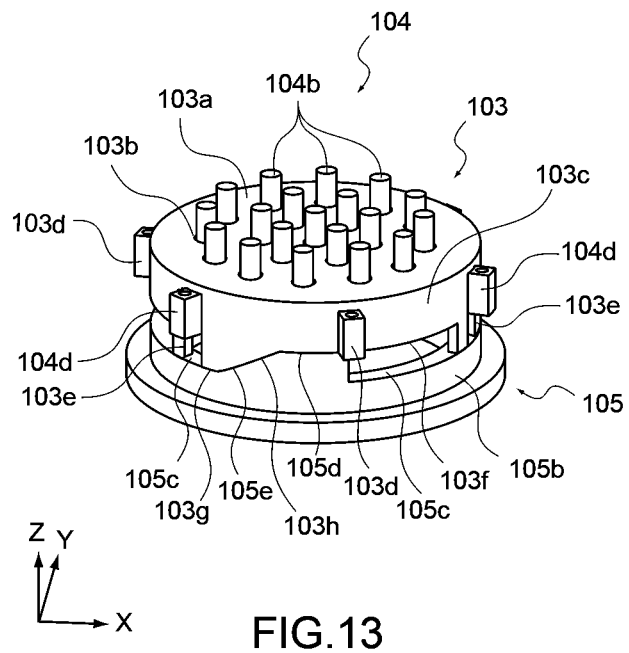
FIG. 13 is a perspective view of the flat plate member, the recessed and projecting member, and the rotation member included in the haptic sensation presenting device.

FIG. 13 is a perspective view showing the state in which the rotation member 105, the recessed and projecting member 104, and the flat plate member 103 are connected to each other. As shown in the figure, the flat plate member 103 is disposed such that the protruding portions 104b are inserted into the through holes 103b (see FIG. 6), the main surface 103a overlaps the support surface 104a, and the side wall portion 104c is located on the inner circumference of the side wall portion 103c. Further, the rotation member 105 and the flat plate member 103 are disposed such that the side wall portion 105b and the side wall portion 103c abut on each other.

Although the state in which the high wall portion 105d and the low wall portion 103f abut on each other is shown in FIG. 13, the abutting portion changes due to rotation of the rotation member 105 as described below. As shown in FIG. 13, the rotation member 105 and the flat plate member 103 are disposed such that the side wall portion 103c abuts on the half region of the end surface of the side wall portion 105b on the outer circumference side.

Figure 14:
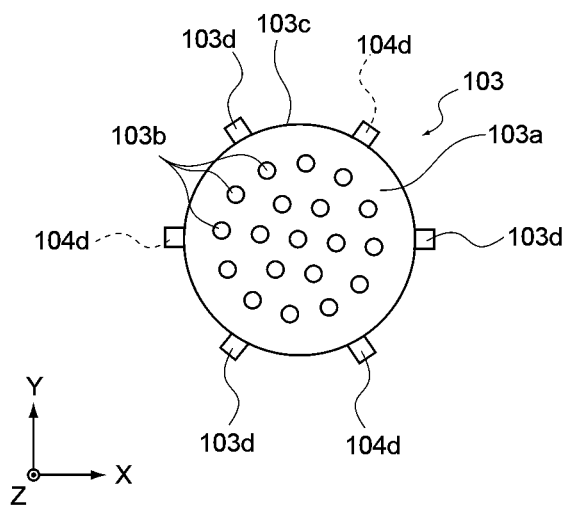
FIG. 14 is a plan view of the flat plate member and the recessed and projecting member included in the haptic sensation presenting device.

Further, as shown in FIG. 13, the recessed and projecting member 104 and the flat plate member 103 are disposed such that the protruding portions 104d are inserted into the notches 103e and protrude toward the outer circumference side of the side wall portion 103c. FIG. 14 is a plan view of the state in which the recessed and projecting member 104 and the flat plate member 103 are connected to each other. As shown in the figure, the protruding portions 103d provided in the side wall portion 103c and the protruding portions 104d inserted into the notches 103e (see FIG. 6) protrude toward the outer circumference of the side wall portion 103c.

The protruding portions 103d and the protruding portions 104d fit into the rails 101d (see FIG. 4) provided in the casing 101. Since the rails 101d extend in a direction (Z direction) perpendicular to the opening surface 101c, the protruding portions 103d guides the movement of the flat plate member 103 in the Z direction while preventing the flat plate member 103 from rotating, and the protruding portions 104d guides the movement of the recessed and projecting member 104 in the Z direction while preventing the recessed and projecting member 104 from rotating.

Figure 15:
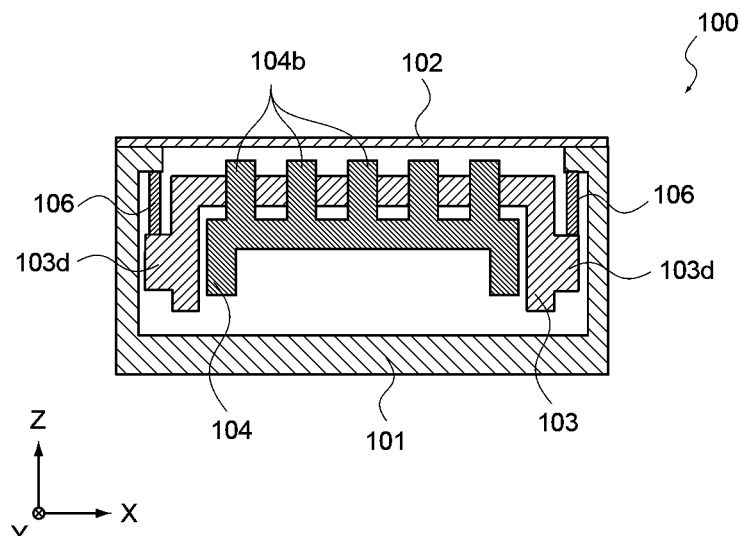
FIG. 15 is a schematic cross-sectional view showing a spring disposed between the flat plate member and the casing, which is included in the haptic sensation presenting device.
Figure 16:
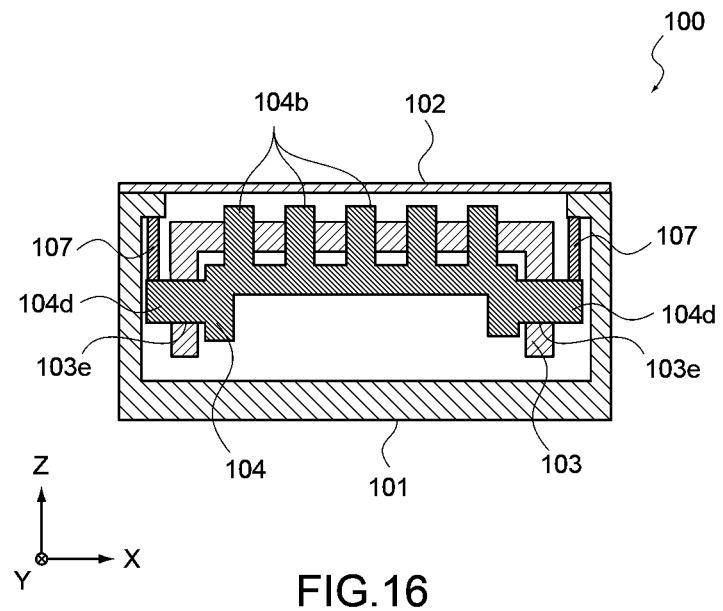
FIG. 16 is a schematic cross-sectional view showing a spring disposed between the recessed and projecting member and the casing, which is included in the haptic sensation presenting device.

Further, a spring is disposed between the protruding portions 103d and the casing 101 and between the protruding portions 104d and the casing 101. FIG. 15 and FIG. 16 are each a schematic diagram showing the spring. As shown in FIG. 15, a spring 106 is provided between the protruding portions 103d and the casing 101. The spring 106 can include three springs each provided in the corresponding protruding portion 103d and can be provided between the protruding portion 103d and the ceiling surface of the rail 101d. Further, as shown in FIG. 16, a spring 107 is provided between the protruding portion 104d and the casing 101. The spring 107 can include three springs each provided in the corresponding protruding portion 104d, and can be provided between the protruding portion 104d and the ceiling surface of the rail 101d.

[Operation of Haptic Sensation Presenting Device]

Figure 17A:
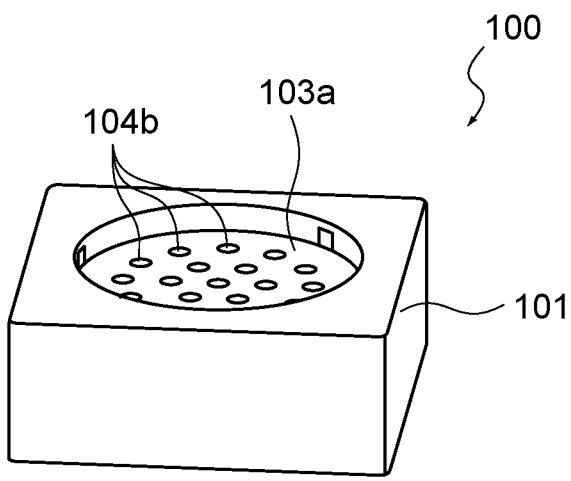
FIGS. 17A, 17B, and 17C are perspective views showing three states of the haptic sensation presenting device.
Figure 17B:
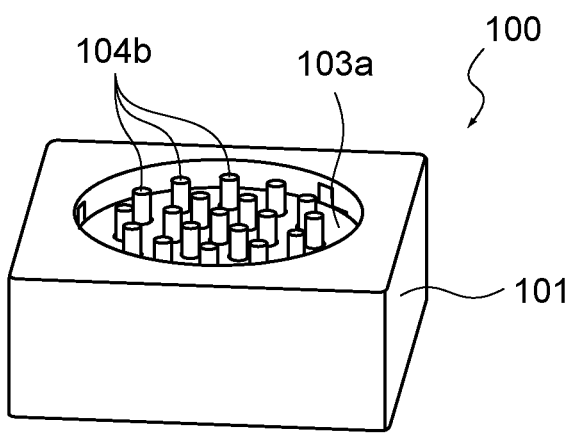
Figure 17C:
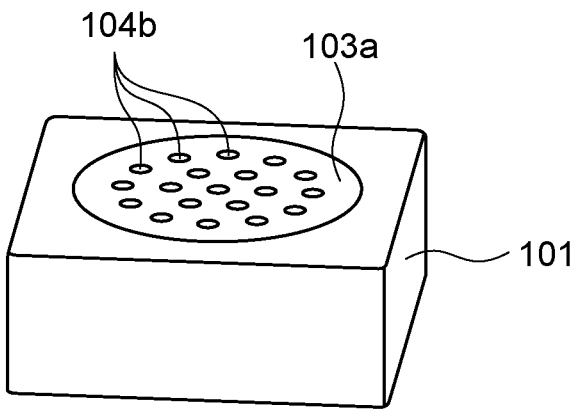
Figure 18A:
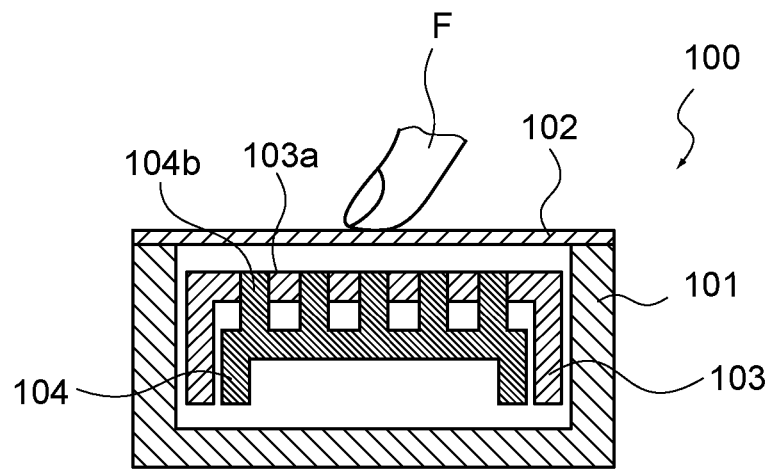
FIGS. 18A, 18B, and 18C are schematic cross-sectional views showing the three states of the haptic sensation presenting device.
Figure 18B:
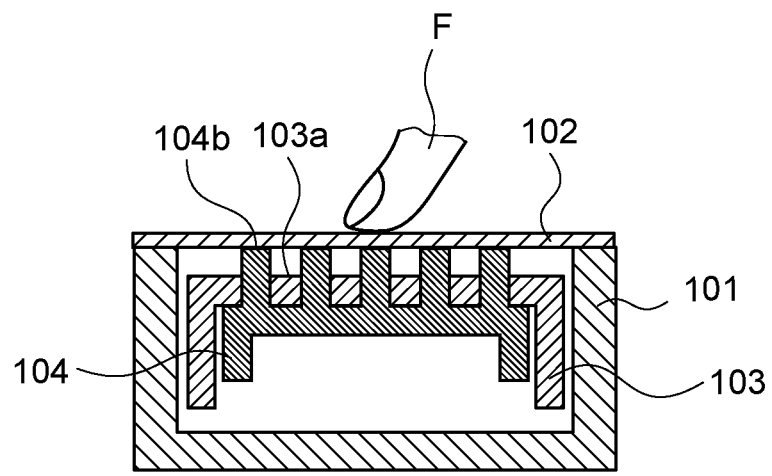
Figure 18C:
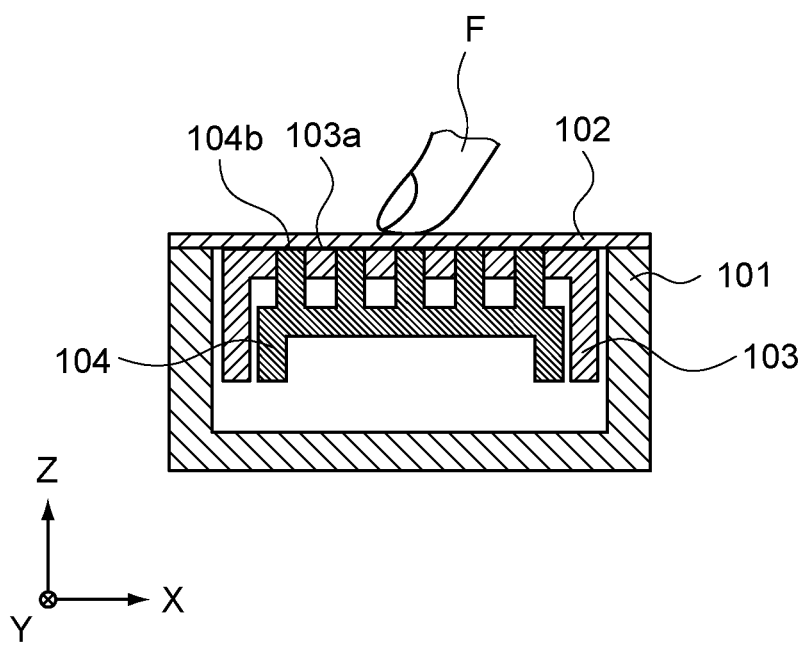

An operation of the haptic sensation presenting device 100 will be described. The haptic sensation presenting device 100 is capable of taking three states of a first state, a second state, and a third state. FIGS. 17A, 17B, and 17C are perspective views showing the three states, and FIGS. 18A, 18B, and 18C are schematic cross-sectional views showing the three states. Further, in FIGS. 18A, 18B, and 18C, a finger F of a user who touches the film 102 of the haptic sensation presenting device 100 is shown.

The haptic sensation presenting device 100 is in the first state in Part (a) of FIGS. 17A and 18A, and the haptic sensation presenting device 100 is in the second state in FIGS. 17B and 18B. Further, the haptic sensation presenting device 100 is in the third state in FIGS. 17C and 18C.

As shown in FIGS. 17A, 17B, 17C, 18A, 18B, and 18C, in the haptic sensation presenting device 100, the flat plate member 103 and the recessed and projecting member 104 independently move in the Z direction, thereby forming the first to third states. FIGS. 19A and 19B are schematic diagrams showing movement of the flat plate member 103. The flat plate member 103 moves between a position at which the main surface 103a matches the opening surface 101c as shown in-Part (a) of FIG. 19A and a position at which the main surface 103a is separated from the opening surface 101c in a direction opposite to the film 102 as shown in-Part (b) of FIG. 19B. Hereinafter, regarding the flat plate member 103, the position at which the main surface 103a matches the opening surface 101c shown in-Part (a) of FIG. 19A is defined as a first position, and the position at which the main surface 103a is separated from the opening surface 101c shown in-Part (b) of FIG. 19B is defined as a second position.

Figure 20A:
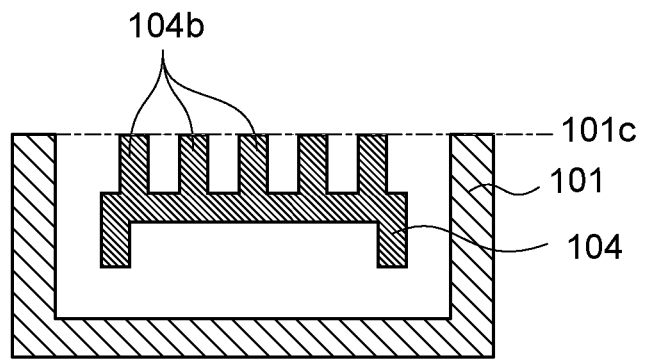
FIGS. 20A and 20B is a are schematic cross-sectional views showing a position of the recessed and projecting member included in the haptic sensation presenting device.
Figure 20B:
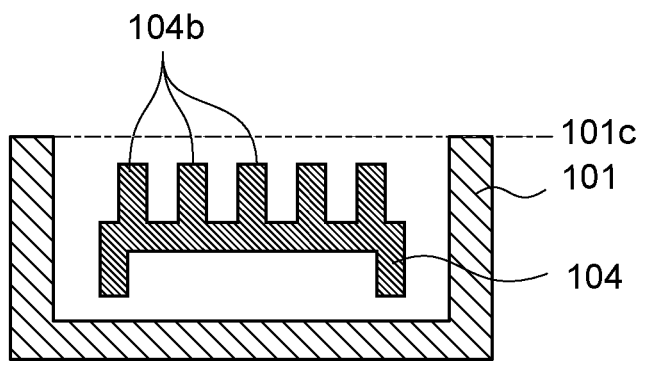
Figure 20B:
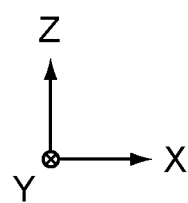

FIGS. 20A and 20B are schematic diagrams showing movement of the recessed and projecting member 104. The recessed and projecting member 104 moves between a position at which the tips of the protruding portions 104b match the opening surface 101c as shown in FIG. 20A and a position at which the tips of the protruding portions 104b are separated from the opening surface 101c in a direction opposite to the film 102 as shown in FIG. 20B. Hereinafter, regarding the recessed and projecting member 104, the position at which the tips of the protruding portions 104b match the opening surface 101c shown in-Part (b) of FIG. 20B is defined as a third position, and the position at which the tips of the protruding portions 104b are separated from the opening surface 101c shown in FIG. 20B is defined as a fourth position. Note that the fourth position is suitably a position at which the main surface 103a of the flat plate member 103 in the second position matches the tips of the protruding portions 104b.

As shown in-Part (a) of FIGS. 17A and 18A, in the first state, the flat plate member 103 is located at the second position and the recessed and projecting member 104 is located at the fourth position. Further, as shown in-Part (b) of FIGS. 17B and 18B, in the second state, the flat plate member 103 is located at the second position and the recessed and projecting member 104 is located at the third position. Further, in the third state shown in FIGS. 17C and Part (c) of FIG. 18C, the flat plate member 103 is located at the first position and the recessed and projecting member 104 is located at the third position.

Since the haptic sensation presenting device 100 takes the first to third states, different haptic sensations can be presented as follows. That is, in the first state shown in-Part (a) of FIG. 18A, the flat plate member 103 and the tips of the recessed and projecting member 104 are separated from the film 102. For this reason, when a user touches the film 102 with a finger or the like, a soft flat haptic sensation by the film 102 can be achieved.

Further, in the second state shown in FIG. 18B, the flat plate member 103 is separated from the film 102 and the tips of the recessed and projecting member 104 abut on the film 102. For this reason, when a user touches with a finger or the like, a recessed and projecting haptic sensation by the recessed and projecting member 104 via the film 102 can be achieved.

Further, in the third state shown in of FIG. 18C, the flat plate member 103 and the tips of the recessed and projecting member 104 abut on the film 102. For this reason, when a user touches the film 102 with a finger or the like, a hard flat haptic sensation by the flat plate member 103 and the recessed and projecting member 104 via the film 102 can be achieved.

As described above, in the haptic sensation presenting device 100, it is possible to present various haptic sensations in accordance with the positions of the flat plate member 103 and the recessed and projecting member 104. Hereinafter, details of the drive mechanism of the flat plate member 103 and the recessed and projecting member 104 will be described.

Figure 21A:
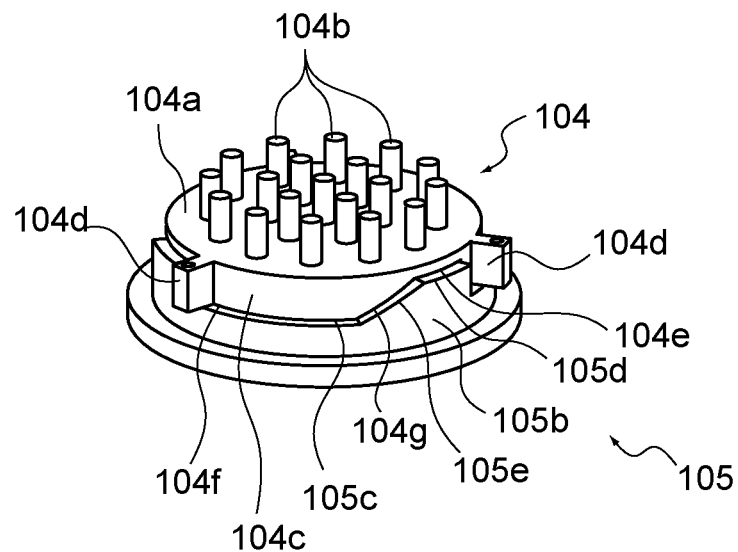
FIGS. 21A, 21B, and 21C is a are perspective views showing a connection relationship between the rotation member and the recessed and projecting member included in the haptic sensation presenting device.
Figure 21B:
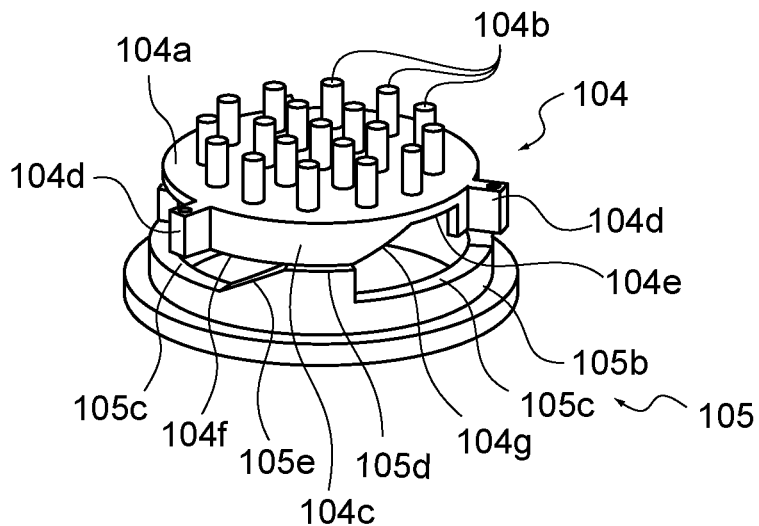
Figure 21C:
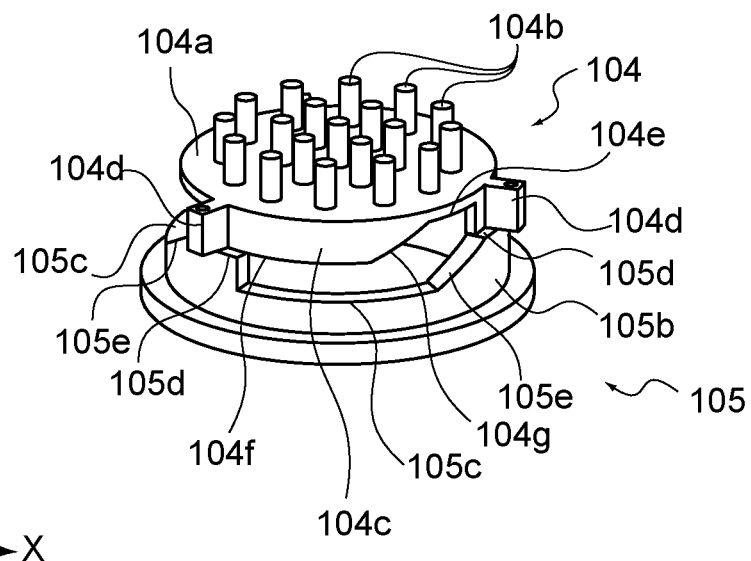
Figure 22A:
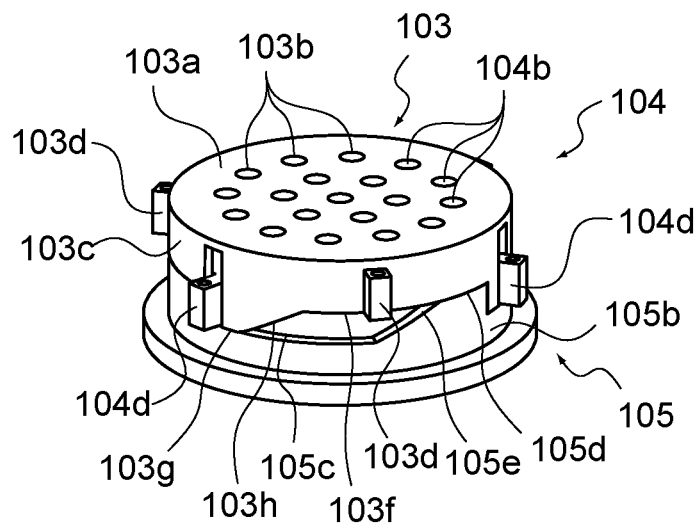
FIGS. 22A, 22B, and 22C are perspective views showing a connection relationship between the flat plate member, the recessed and projecting member, and the rotation member included in the haptic sensation presenting device.
Figure 22B:
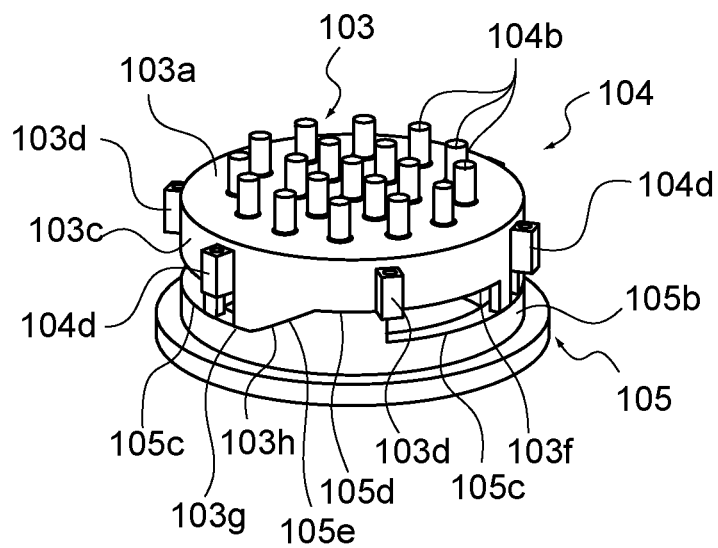
Figure 22C:
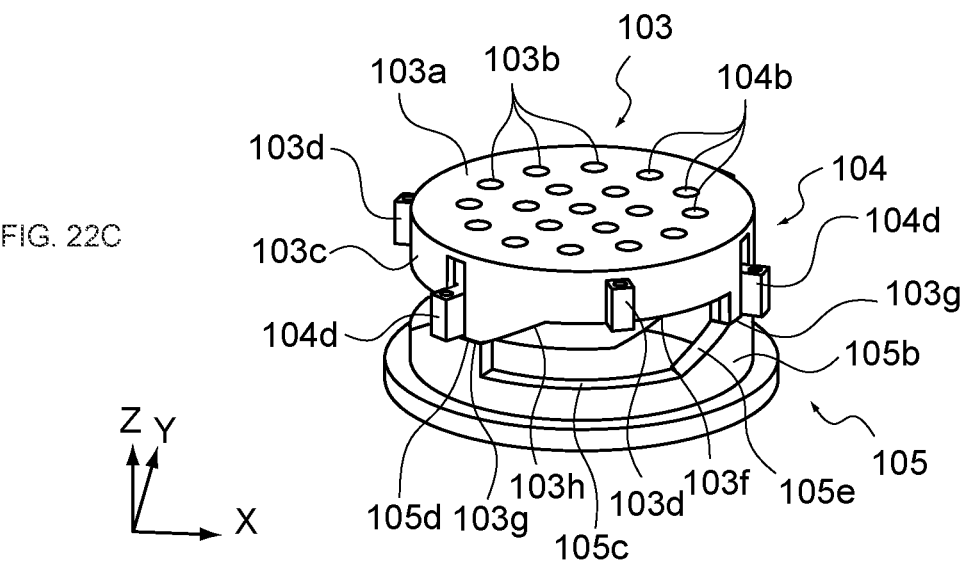
Figure 23A:
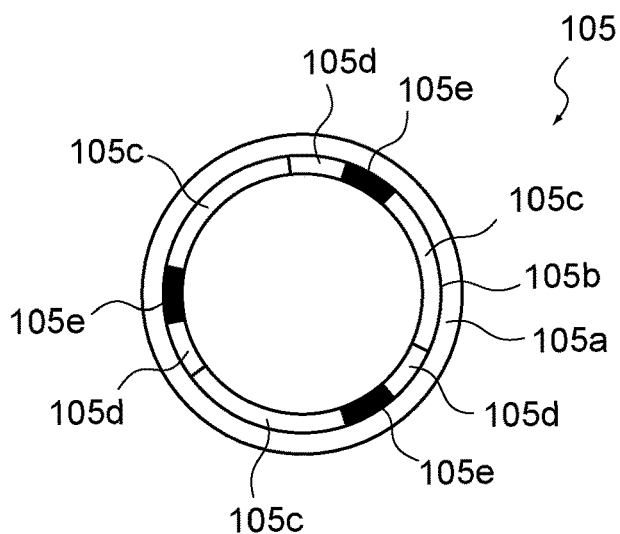
FIGS. 23A, 23B, and 23C are plan views showing rotation of the rotation member included in the haptic sensation presenting device.
Figure 23B:
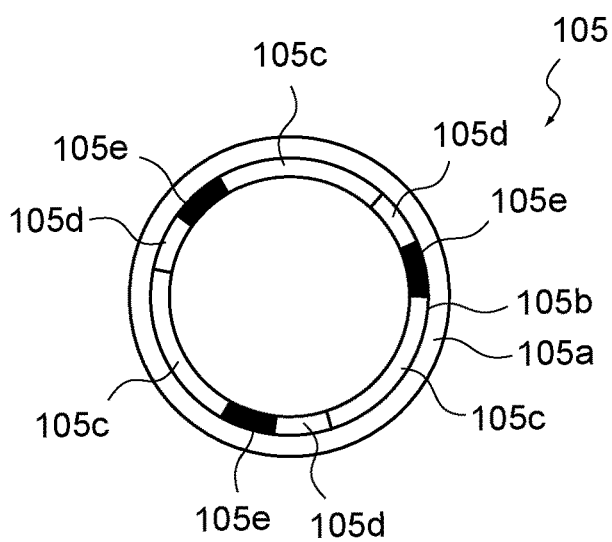
Figure 23C:
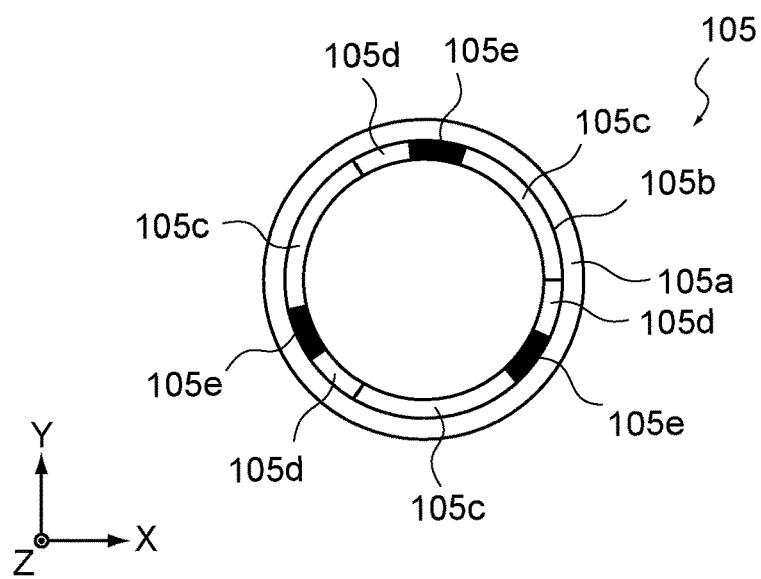
Figure 24A:
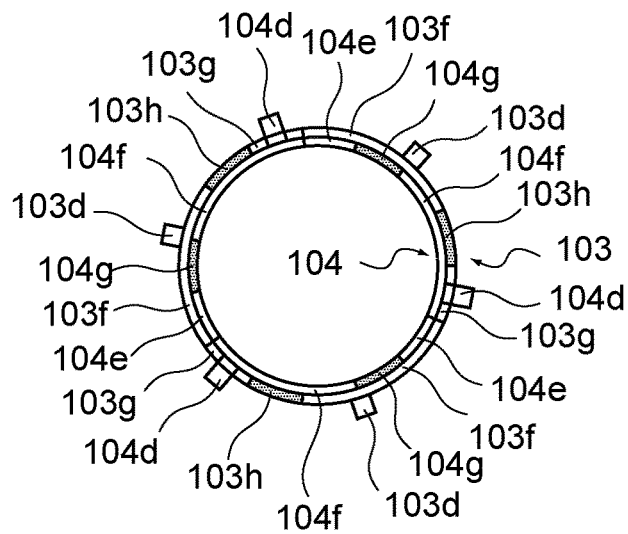
FIGS. 24A, 24B, and 24C are plan views showing a positional relationship between the flat plate member and the recessed and projecting member included in the haptic sensation presenting device.
Figure 24B:
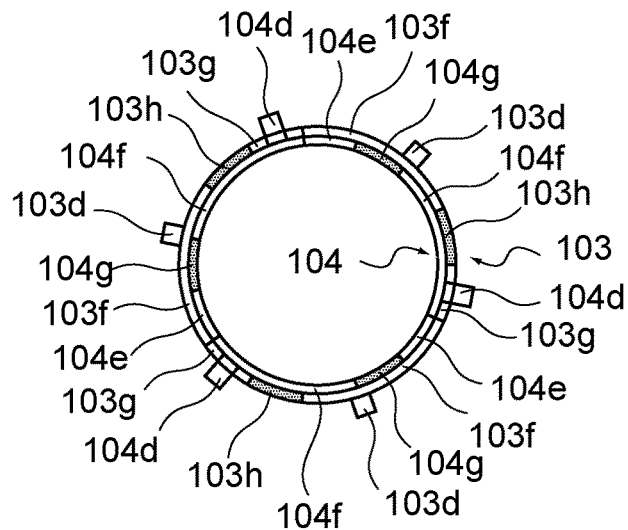
Figure 24C:
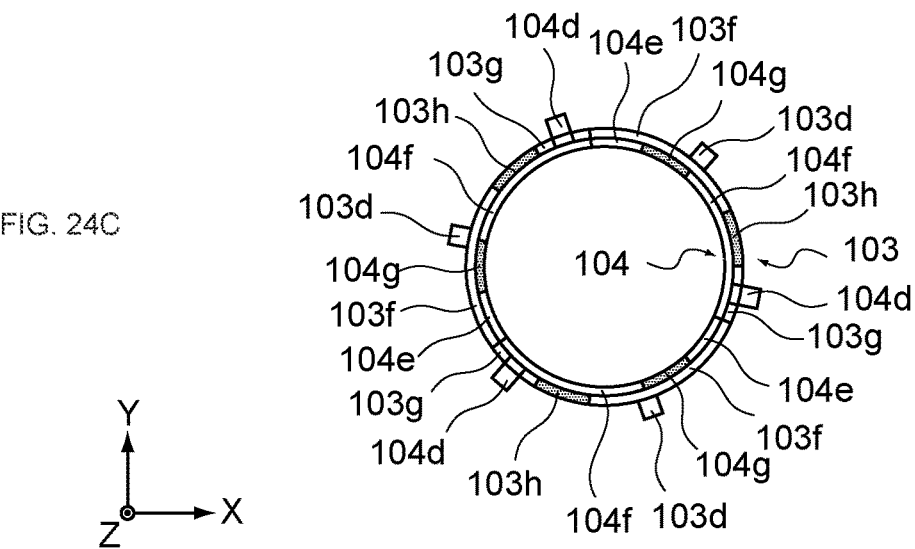
Figure 25A:
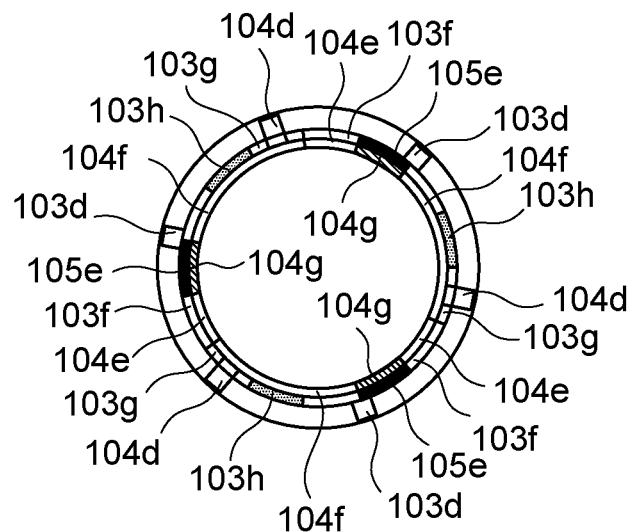
FIGS. 25A, 25B, and 25C are plan views showing a change in the positional relationship between the flat plate member, the recessed and projecting member, and the rotation member included in the haptic sensation presenting device due to rotation.
Figure 25B:
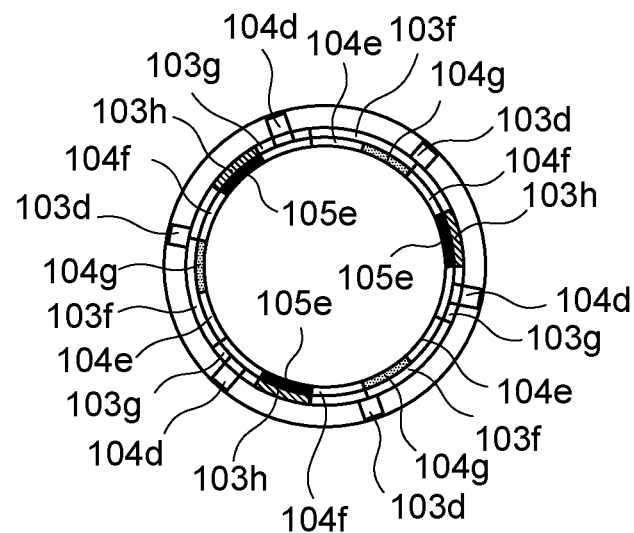
Figure 25C:
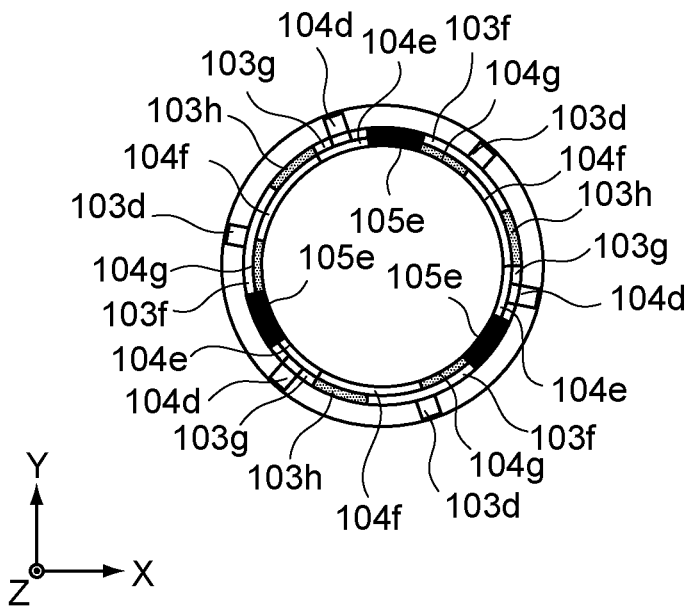

FIGS. 21A, 21B, and 21C are perspective views showing the states of the rotation member 105 and the recessed and projecting member 104 due to the rotation of the rotation member 105. FIGS. 22A, 22B, and 22C is a are perspective views showing the states of the rotation member 105, the recessed and projecting member 104, and the flat plate member 103 due to the rotation of the rotation member 105. FIGS. 23A, 23B, and 23C are plan views showing the rotation of the rotation member 105. FIGS. 24A, 24B, and 24C are plan views showing the states of the recessed and projecting member 104 and the flat plate member 103 due to the rotation of the rotation member 105. FIGS. 25A, 25B, and 25C are plan views showing the states of the rotation member 105, the recessed and projecting member 104, and the flat plate member 103 due to the rotation of the rotation member 105.

In FIGS. 23A, 23B, 23C, 25A, 25B, and 25C, the region corresponding to the inclined portion 105e is shown in black. Further, in FIGS. 24A, 24B, 24C, 25A, 25B, and 25C, the regions corresponding to the inclined portion 103h and the inclined portion 104g are shown in grey. Further, in FIGS. 25A, 25B, and 25C, the region where the inclined portion 105e and the inclined portion 103h overlap with each other and the region where the inclined portion 105e and the inclined portion 104g overlap with each other are shown by diagonal hatching.

FIG. 23A shows the rotation start position and the rotation angle is 0°. FIG. 23B shows the state rotated clockwise by 48° from the state shown in FIGS. 23A, and 23C shows the state rotated clockwise by 96° from the state shown in FIG. 23A. In FIG. 21A, 21B, 21C, 22A, 22B, 22C, 23A, 23B, 23C, 24A, 24B, 24C, 25A, 25B, and FIG. 25C, FIGS. 21A, 22A, 23A, 24A, and 25A each figure shows the state of the rotation angle 0°, FIGS. 21B, 22B, 23B, 24B, and 25B each figure shows the state of the rotation angle 48°, and FIGS. 21C, 22C, 23C, 24C, and 25C each figure shows the state of the rotation angle 96°. Note that since the flat plate member 103 and the recessed and projecting member 104 move only in the Z direction relative to the casing 101 and do not rotate as described above, FIGS. 24A, 24B, and 24C are the same figure. As shown in FIGS. 24A, 24B, and 24C, the inclined portion 103h and the inclined portion 104g are provided at different positions on the circumference of the rotation member 105 as viewed from the Z direction.

In the case where the rotation angle of the rotation member 105 is 0° as shown in FIG. 23A, the inclined portion 105e abuts on the inclined portion 104g, and the low wall portion 105c and the high wall portion 105d respectively abut on the high wall portion 104f and the low wall portion 104e as shown in FIGS. 21A and FIG. 25A. For this reason, the recessed and projecting member 104 is located at a position (fourth position) closest to the rotation member 105.

Further, as shown in FIGS. 22A and FIG. 25A, the inclined portion 105e is separated from the inclined portion 103h, and the low wall portion 105c and the high wall portion 105d respectively abut on the high wall portion 103g and the low wall portion 103f. For this reason, the flat plate member 103 is located at a position (second position) closest to the rotation member 105. Therefore, at the rotation angle 0°, the haptic sensation presenting device 100 takes the first state.

When rotating from this state to the rotation angle 48° shown in FIG. 23B, regarding the recessed and projecting member 104, the rotation member 105 rotates while causing the inclined portion 105e and the inclined portion 104g to slide as shown in-Part (a) of FIG. 21A and the rotation member 105 moves the recessed and projecting member 104 toward the opening surface 101c along the Z direction. When the rotation member 105 rotates to the rotation angle 48°, the high wall portion 105d abuts on the high wall portion 104f and moves the recessed and projecting member 104 to a position (third position) farthest from the rotation member 105 as shown in FIGS. 21B and FIG. 25B. Along with this movement, the recessed and projecting member 104 compresses the spring 107 (see FIG. 16).

At this time, regarding the flat plate member 103, the rotation member 105 rotates while the inclined portion 105e and the inclined portion 103h do not abut on each other and the high wall portion 105d abuts on the low wall portion 103f as shown in FIG. 22A. When the rotation member 105 rotates to the rotation angle 48°, the inclined portion 105e abuts on the inclined portion 103h as shown in FIGS. 22B and 25B. Since the high wall portion 105d and the low wall portion 103f still abut on each other by the rotation up to this position, the flat plate member 103 does not move in the Z direction and maintains the position closest to the rotation member 105. Therefore, at the rotation angle 48°, the haptic sensation presenting device 100 takes the second state.

Further, when rotating from the rotation angle 48° to the rotation angle 96° shown in FIG. 23C, regarding the recessed and projecting member 104, the rotation member 105 rotates while the inclined portion 105e and the inclined portion 104g do not abut on each other and the high wall portion 105d abuts on the high wall portion 104f as shown in FIG. 21B. Even when the rotation member 105 rotates to the rotation angle 96°, since the high wall portion 105d and the high wall portion 104f still abut on each other as shown in FIGS. 21C and 25C, the recessed and projecting member 104 does not move in the Z direction and maintains the position (third position) farthest from the rotation member 105.

At this time, regarding the flat plate member 103, the rotation member 105 rotates while causing the inclined portion 105e and the inclined portion 103h to slide as shown in FIG. 22B and the rotation member 105 moves the flat plate member 103 toward the opening surface 101c along the Z direction. When the rotation member 105 rotates to the rotation angle 96°, as shown in of FIGS. 22C and 25C, the high wall portion 105d abuts on the high wall portion 103g and moves the flat plate member 103 to a position (first position) farthest from the rotation member 105. Along with this movement, the flat plate member 103 compresses the spring 106 (see FIG. 15). Therefore, at the rotation angle 96°, the haptic sensation presenting device 100 takes a third state.

Further, when rotating from the rotation angle 96° to the rotation angle 0° shown in FIG. 23C, regarding the recessed and projecting member 104, as shown in FIG. 21C, the contact area of the high wall portion 105d with the high wall portion 104f decreases due to the rotation of the rotation member 105 and the high wall portion 105d and the high wall portion 104f do not come into contact with each other at a predetermined rotation angle. Then, the recessed and projecting member 104 is pressed in a direction away from the opening surface 101c by the pressing by the spring 107 and returns to the position (fourth position) closest to the rotation member 105.

At this time, regarding also the flat plate member 103, as shown in FIG. 22C, the contact area of the high wall portion 105d with the high wall portion 103g decreases due to the rotation of the rotation member 105 and the high wall portion 105d and the high wall portion 103g do not come into contact with each other at a predetermined rotation angle. Then, the flat plate member 103 is pressed in a direction away from the opening surface 101c by the pressing by the spring 106 and returns to the position (second position) closest to the rotation member 105.

Since the inclined portion 103h and the inclined portion 104g are provided at different positions on the circumference of the rotation member 105 as viewed from the Z direction in the haptic sensation presenting device 100 as described above, the inclined portion 105e abuts on only one of the inclined portion 103h and the inclined portion 104g in accordance with the rotation angle of the rotation member 105. For this reason, by rotating the rotation member 105 clockwise, it is possible to independently move the flat plate member 103 and the recessed and projecting member 104 in the Z direction and switch between the above-mentioned first state, second state, and third state can be switched.

Note that in the haptic sensation presenting device 100, the operation described above may be performed in the case where the rotation member 105 is rotated counterclockwise by reversing the orientation of the inclined portion of each member. Further, although the haptic sensation presenting device 100 takes the first state at the rotation angle 0°, the second state at the rotation angle 48°, and the third state at the rotation angle 96°, each of the angles can be arbitrarily changed depending on the shape of each member.

As described above, in the haptic sensation presenting device 100, the first to third states can be achieved by independently moving the flat plate member 103 and the recessed and projecting member 104 by the rotation of the rotation member 105. In the first to third states, it is possible to achieve different haptic sensations (see FIGS. 18A, 18B, and 18C) and present a variety of haptic sensations. Further, the first to third states can be switched by only the rotation of the rotation member 105 and the control thereof is easy.

Regarding Drive Control of Rotation Member

Figure 26:
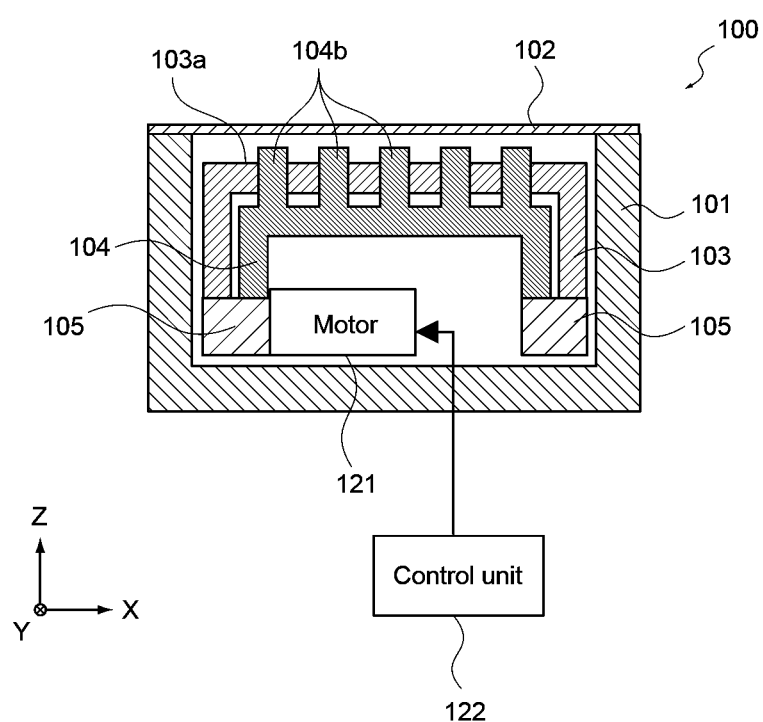
FIG. 26 is a schematic diagram showing a motor and a control unit included in the haptic sensation presenting device.

In the haptic sensation presenting device 100, by rotating the rotation member 105 by a motor, it is possible to switch between the first to third states described above. FIG. 26 is a schematic diagram showing the drive mechanism of the haptic sensation presenting device 100.

As shown in the figure, the haptic sensation presenting device 100 includes a motor 121 and a control unit 122. The motor 121 is a servo motor, a stepping motor, a DC (direct-current) motor, or the like, and rotates the rotation member 105 in the way as described above. The motor 121 can be disposed on, for example, the inner circumference side of the rotation member 105, but the disposition is not particularly limited.

The control unit 122 is connected to the motor 121 and supplies a drive signal to the motor 121. The control unit 122 rotates the motor 121 at a predetermined angle so that, for example, the rotation member 105 is located at the rotation position of 0°, 48°, and 96° as described above, thereby making the haptic sensation presenting device 100 take the first to third states.

Further, it is possible to make the haptic sensation presenting device 100 take, from the first state, the second state, the third state, and then the first state again by rotating the rotation member 105 in the same rotation direction. For this reason, when the control unit 122 rotates the motor 121 in the same rotation direction in a continuous manner, the first to third states are continuously switched in the haptic sensation presenting device 100 and a vibration by the movement of the flat plate member 103 and the recessed and projecting member 104 can be generated.

The rotation speed of the rotation member 105 at this time is not particularly limited. However, since the tactile receptors of humans are most sensitive to the vibration of 100 Hz to 200 Hz, the rotation speed such that a vibration in such a range is achieved is suitable. Further, the control unit 122 is capable of dynamically changing the vibration frequency of the flat plate member 103 and the recessed and projecting member 104 by changing the rotation speed of the motor 121.

Figure 27:
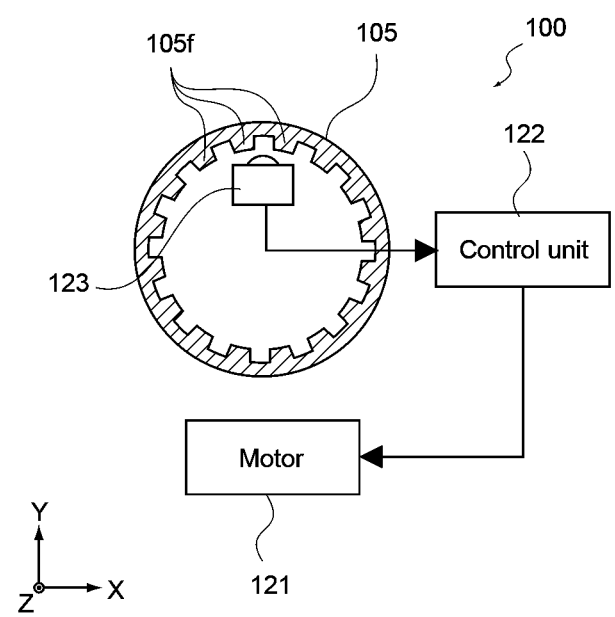
FIG. 27 is a schematic diagram showing the motor, a sensor, and the control unit included in the haptic sensation presenting device.

Further, the haptic sensation presenting device 100 may include a sensor for detecting the rotation angle of the rotation member 105. FIG. 27 is a schematic diagram showing the haptic sensation presenting device 100 that includes a sensor 123. As shown in the figure, recessions and projections 105f parallel to the rotation axis direction (Z direction) are provided on the inner circumference of the rotation member 105 and the number of times that the recessions and projections 105f have passed is counted by the sensor 123. The sensor 123 can be, for example, a ranging sensor.

The control unit 122 is capable of calculating, from the number of times that the recessions and projections 105f have passed, which is output from the sensor 123, the accurate rotation angle of the rotation member 105 and feeding back the rotation angle to the control of the motor 121. In particular, in the case where the motor is a stepping motor a DC motor, since the accurate rotation angle cannot be acquired on the side of the motor 121, it is effective to use the sensor 123. Note that in the rotation member 105, a detection target such as a light reflection member, a lightemitting member, and a striped pattern may be provided instead of the recessions and projections 105f.

Regarding Expansion of Film

In the haptic sensation presenting device 100, although the first to third states can be achieved in accordance with the positions of the flat plate member 103 and the recessed and projecting member 104 as described above, another haptic sensation can be presented by expanding the film 102.

Figure 28:
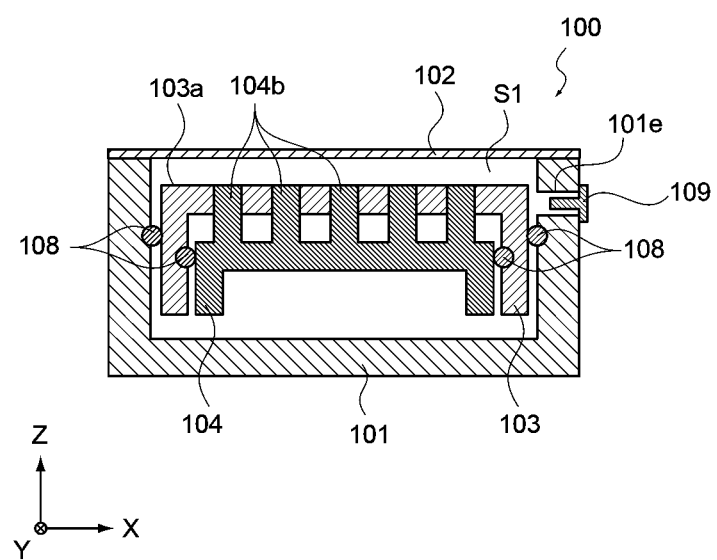
FIG. 28 is a schematic cross-sectional view showing an active valve and a piston ring included in the haptic sensation presenting device.

FIG. 28 is a schematic diagram showing the haptic sensation presenting device 100 having a configuration capable of expanding the film 102. As shown in the figure, the haptic sensation presenting device 100 includes, in addition to the configuration described above, a piston ring 108 and an active valve 109. Note that in the following drawings, illustration of the rotation member 105 is omitted.

The piston ring 108 is disposed between the casing 101 and the flat plate member 103 and between the flat plate member 103 and the recessed and projecting member 104, and seals the space between the respective members while making the flat plate member 103 and the recessed and projecting member 104 movable. As shown in FIG. 28, the space that is surrounded by the casing 101, the film 102, the flat plate member 103, and the recessed and projecting member 104 and sealed by the piston ring 108 is referred to as the space S1.

The active valve 109 is a valve that can be arbitrarily opened and closed, and is disposed between the space S1 and the external space. As shown in FIG. 28, a vent 101e is provided at a position of the casing 101 facing the space S1 and the active valve 109 can be provided so as to be capable of opening and closing the vent 101e.

Figure 29A:
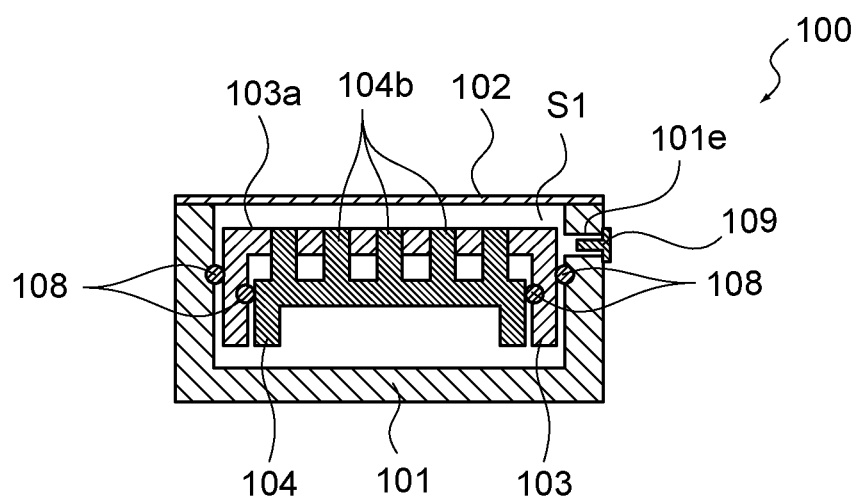
FIGS. 29A, 29B, and 29C are schematic cross-sectional views showing an operation of the haptic sensation presenting device when the active valve is closed.
Figure 29B:
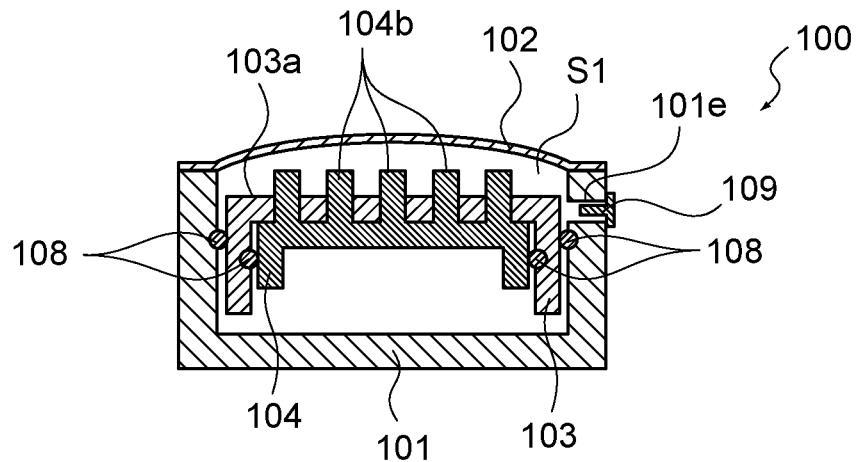
Figure 29C:
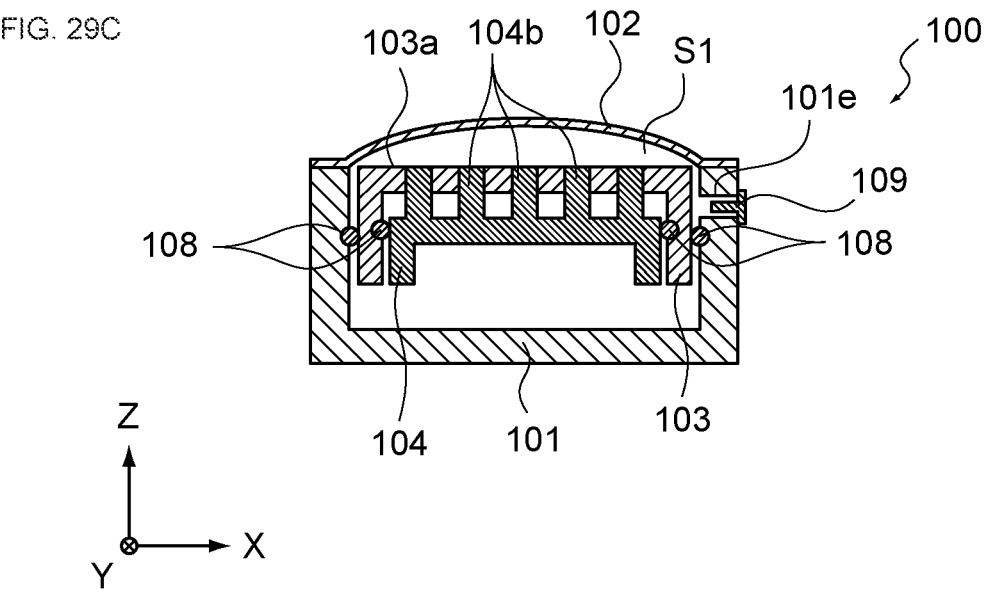
Figure 30A:
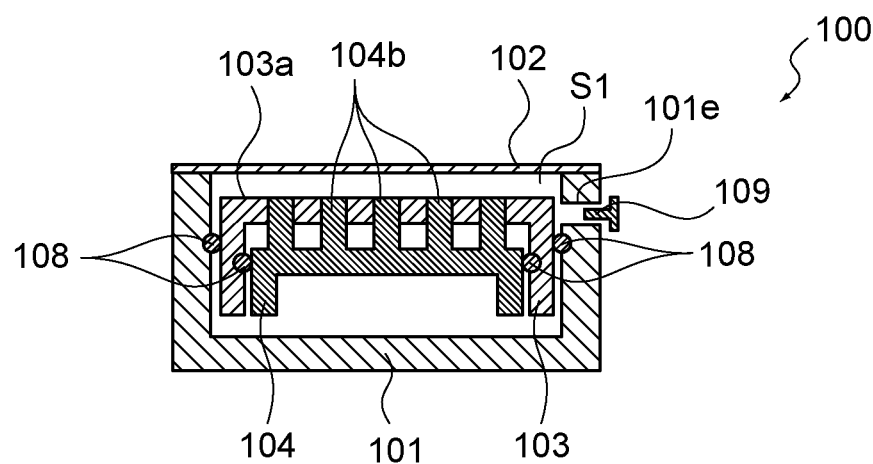
FIGS. 30A, 30B, and 30C are schematic cross-sectional views showing an operation of the haptic sensation presenting device when the active valve is opened.
Figure 30B:
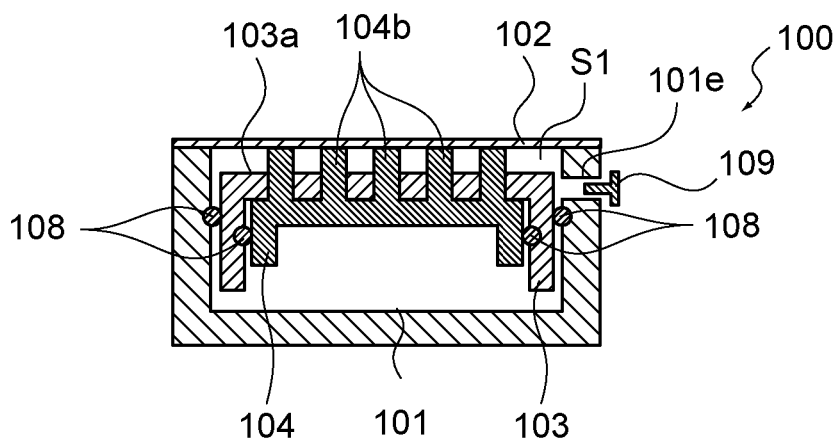
Figure 30C:
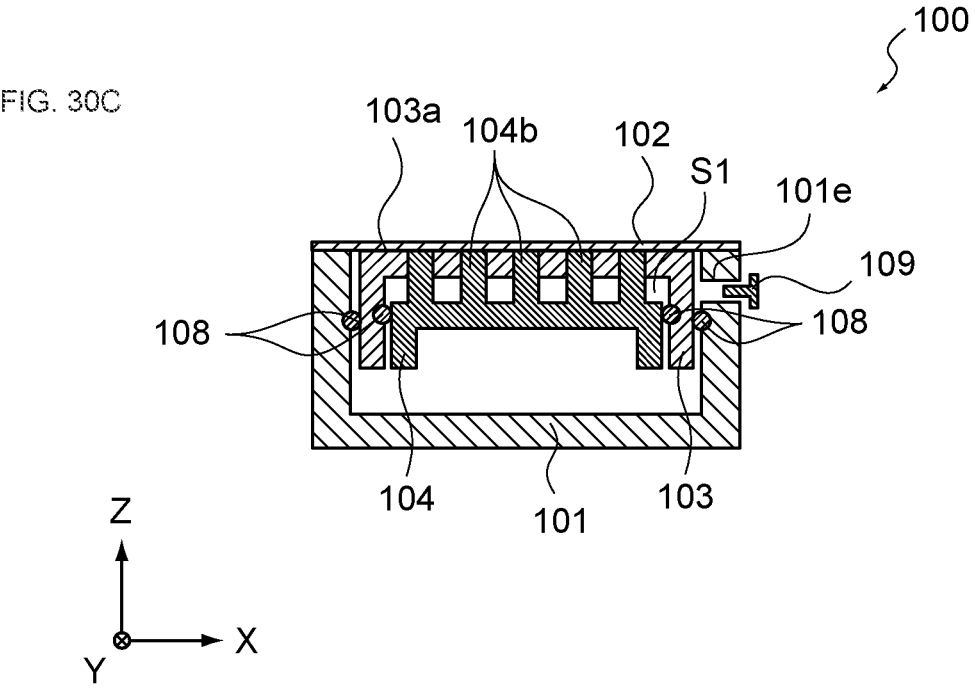

FIGS. 29A, 29B, 29C, 30A, 30B, and 30C are each a schematic diagram showing the operation of the haptic sensation presenting device 100. FIGS. 29A, 29B, and 29C show the state in which the active valve 109 is closed, and FIGS. 30A, 30B, and 30C show the state in which the active valve 109 is opened. In the state shown in FIGS. 29A, 29B, and 29C in which the active valve 109 is closed, since the protruding portions 104b enter the space S1 when the first state shown in Part (a) of FIG. 29A changes to the second state shown in FIG. 29B, the space S1 is pressurized by the amount corresponding thereto and the film 102 expands. Further, when the second state shown in FIG. 29B changes to the third state shown in FIG. 29C, the protruding portions 104b further enter the space S1 and the film 102 further expands.

Meanwhile, in the state shown in FIGS. 30A, 30B, and 30C in which the active valve 109 is opened, air flows out of the space S1 via the active valve 109 and the film 102 does not expand even when the first state shown in-Part (a) of FIG. 30A changes to the second state shown in FIG. 30B and the third state shown in FIG. 30C. As described above, it is possible to switch whether or not to expand the film 102 by opening and closing the active valve 109.

Here, the state shown in FIGS. 29B and 29C in which the film 102 has expanded is different from the first state shown in FIG. 29A in the elasticity and shape of the film 102 and presents another haptic sensation to a user. Therefore, the state in which the film 102 has expanded forms a fourth state different from the first to third states (see FIGS. 30A, 30B, and 30C) in which the film 102 has not expanded. In this way, in the haptic sensation presenting device 100, by providing the piston ring 108 and the active valve 109, it is possible to expand the film 102 to present still another haptic sensation.

Figure 31:
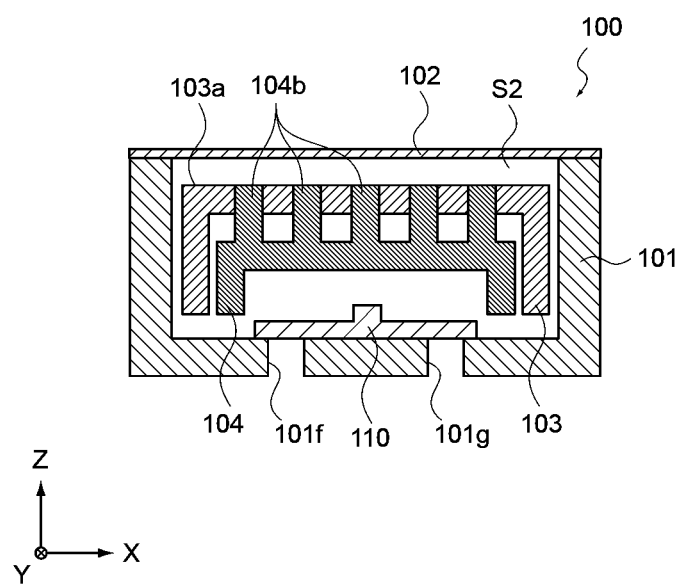
FIG. 31 is a schematic cross-sectional view showing a pump included in the haptic sensation presenting device.

Further, in the haptic sensation presenting device 100, the film 102 may be expanded by another mechanism. FIG. 31 is a schematic diagram showing the haptic sensation presenting device 100 that includes a pump 110. When a space surrounded by the casing 101 and the film 102 is defined as a space S2, the pump 110 is connected to an intake port 101f and an exhaust port 101g provided in the casing 101, causes air to flow into the space S2, and exhausts air from the space S2. The configuration of the pump 110 is not particularly limited, but the pump 110 can be a micropump including a diaphragm that can be bent by a piezoelectric element, or the like.

Figure 32A:
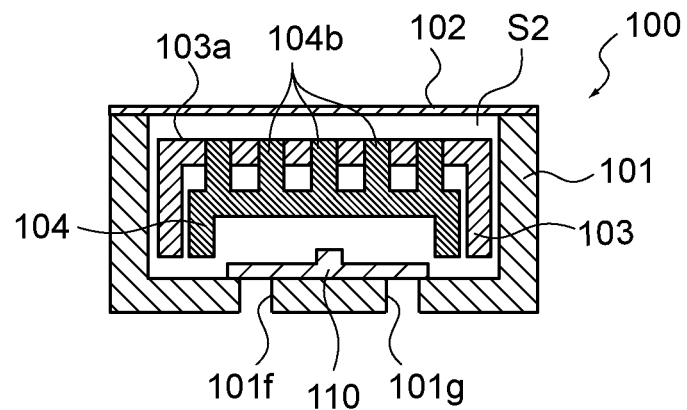
FIGS. 32A and 32B are schematic cross-sectional views showing an operation of the pump of the haptic sensation presenting device.
Figure 32B:
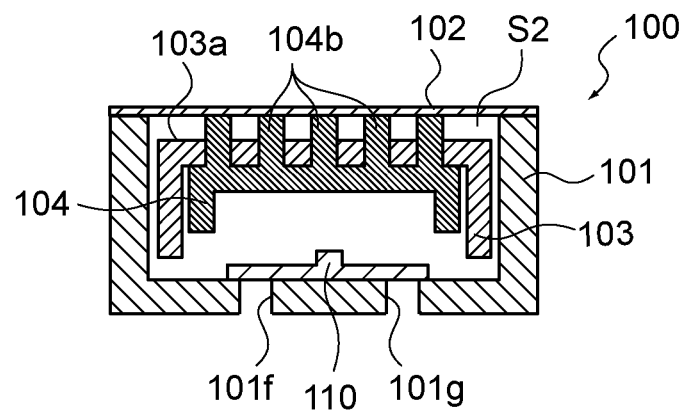
Figure 32B:
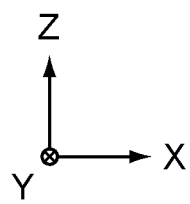
Figure 33A:
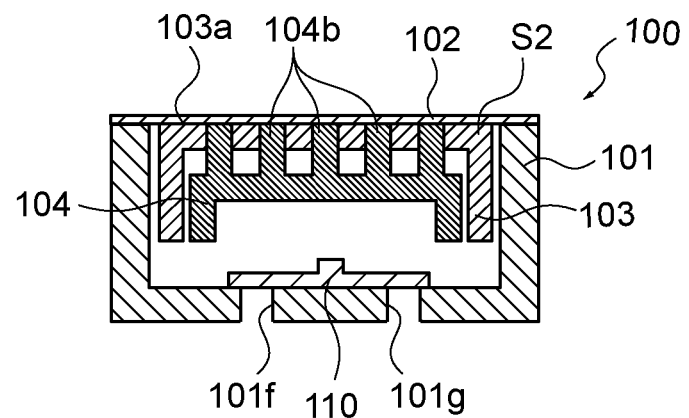
FIGS. 33A and 33B are schematic cross-sectional views showing an operation of the pump of the haptic sensation presenting device.
Figure 33B:
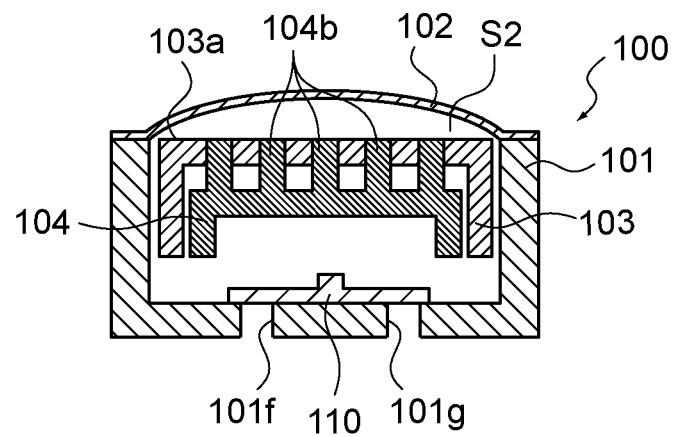
Figure 33B:
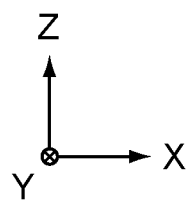

FIGS. 32A, 32B, 33A, and FIG. 33B are each a schematic diagrams showing the change in the state of this haptic sensation presenting device 100. In FIGS. 32A, 32B, and 33A, the space S2 is not pressurized by the pump 110, and the flat plate member 103 and the recessed and projecting member 104 respectively take the first state, the second state, and the third state. In of FIG. 33B, the space S2 is pressurized by the pump 110, and the haptic sensation presenting device 100 takes the fourth state in which the film 102 has expanded. Note that in the fourth state, the flat plate member 103 and the recessed and projecting member 104 may be located at any of the positions of the first to third states. projecting member 104 respectively take the first state, the second state, and the third state. In part (b) of FIG. 33, the space S2 is pressurized by the pump 110, and the haptic sensation presenting device 100 takes the fourth state in which the film 102 has expanded. Note that in the fourth state, the flat plate member 103 and the recessed and projecting member 104 may be located at any of the positions of the first to third states.

As described above, in the haptic sensation presenting device 100, it is possible to further present a variety of haptic sensations by arbitrarily expanding the film 102 as well as using the positions of the flat plate member 103 and the recessed and projecting member 104.

Regarding Position of Recessed and Projecting Member

As described above, the recessed and projecting member 104 takes the third position at which the tips of the protruding portions 104b match the opening surface 101c and the fourth position at which the tips of the protruding portions 104b are separated from the opening surface 101c. Here, the recessed and projecting member 104 may be further configured to be movable to a position at which the tips of the protruding portions 104b protrude from the opening surface 101c.

Figure 35A:
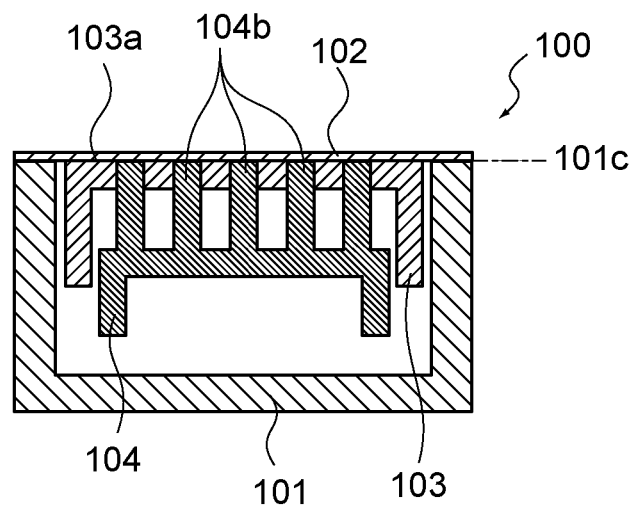
FIGS. 35A and 35B are schematic cross-sectional views showing further movement of the recessed and projecting member of the haptic sensation presenting device.

FIGS. 34A, 34B, 35A, and FIG. 35B are each a schematic diagram showing the operation of this haptic sensation presenting device 100. As described above, in the first state shown in FIG. 34A, the recessed and projecting member 104 is located at the fourth position, moves from here in the Z direction, and moves to the third position as shown in FIG. 34B. In the second state shown in FIG. 34B, the flat plate member 103 is located at the second position, moves from here in the Z direction, and moves to the first position as shown in FIG. 35A.

Figure 35B:
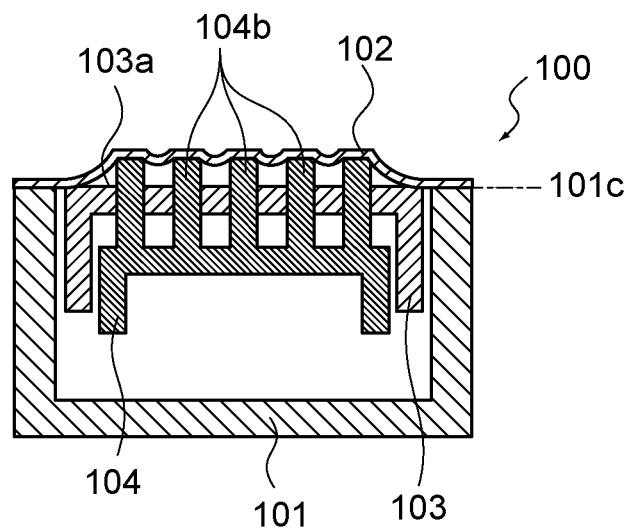
Figure 35B:
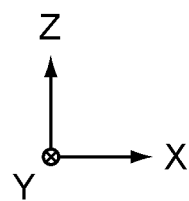

Here, the recessed and projecting member 104 further moves in the Z direction and can be movable to a fifth position at which the tips of the protruding portions 104b further protrude from the opening surface 101c as shown in FIG. 35B. When the recessed and projecting member 104 moves to the fifth position, also the film 102 protrudes by the protruding portions 104b as shown in FIG. 35B, thereby making it possible to generate still another haptic sensation. The recessed and projecting member 104 can be moved to the fifth position by providing a two-step inclined portion in the rotation member 105.

Modified Example

Figure 36:
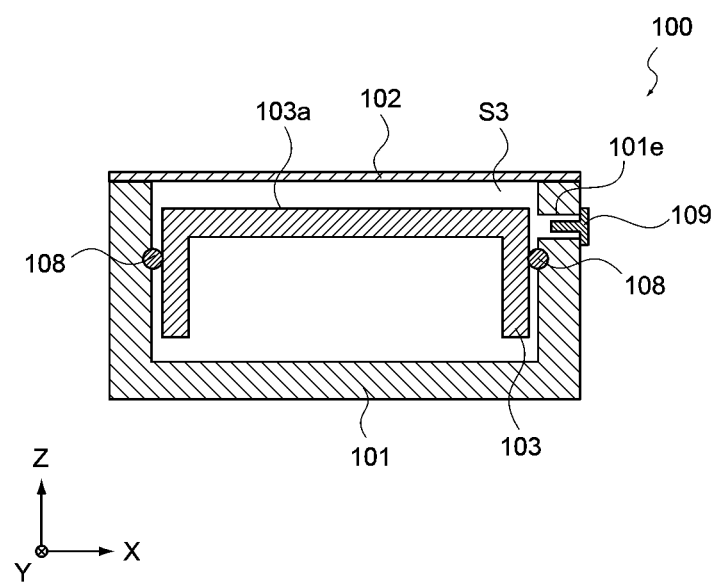
FIG. 36 is a schematic cross-sectional view of a haptic sensation presenting device according to a first modified example of the present technology.

A modified example of the haptic sensation presenting device 100 according to this embodiment will be described. FIG. 36 is a schematic diagram showing the haptic sensation presenting device 100 according to a first modified example. As shown in the figure, the haptic sensation presenting device 100 does not necessarily need to include the recessed and projecting member 104. The flat plate member 103 does not include the through holes 103b and is connected to the rotation member 105 (not shown) by the above-mentioned configuration (see FIG. 13). When a space surrounded by the casing 101, the film 102, and the flat plate member is defined as a space S3, the piston ring 108 for sealing the space S3 is provided between the flat plate member 103 and the casing 101 and the vent 101e that communicates with the space S3 and the external space is provided in the casing 101. The active valve 109 is provided in the vent 101e.

Figure 37A:
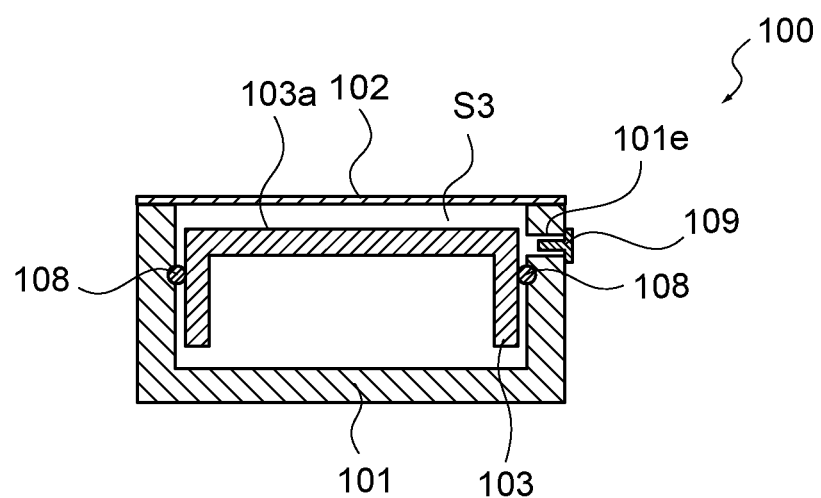
FIGS. 37A and 37B are schematic cross-sectional views showing an operation of the haptic sensation presenting device.
Figure 37B:
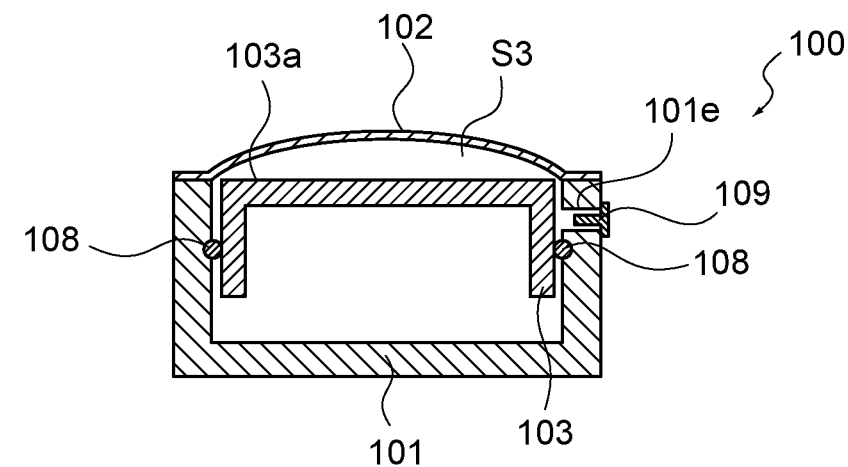
Figure 37B:
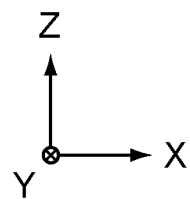
Figure 38A:
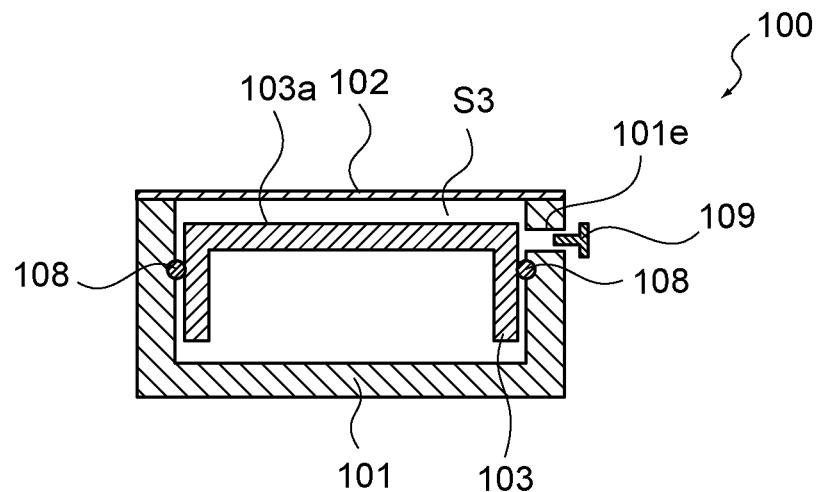
FIGS. 38A and 38B are schematic cross-sectional views showing an operation of the haptic sensation presenting device.
Figure 38B:
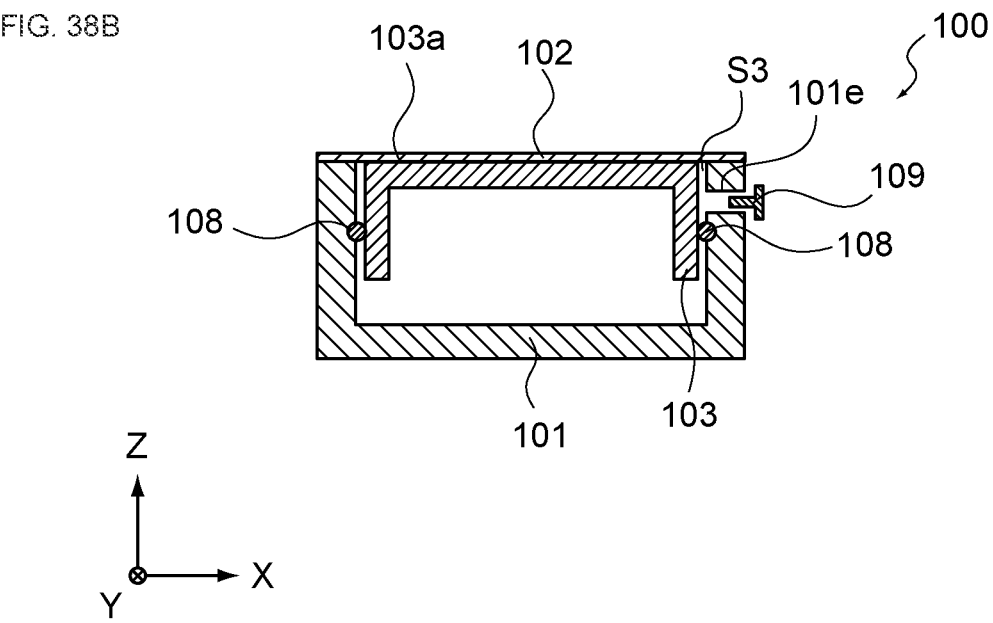

FIGS. 37A, 37B, 38A, and 38B are each a schematic diagram showing the operation of this haptic sensation presenting device 100. FIGS. 37A and 37B show the state in which the active valve 109 is closed, and FIGS. 38A and 38B show the state in which the active valve 109 is opened. In the state in which the active valve 109 is closed, when the flat plate member 103 moves from the second position shown in FIG. 37A to the first position shown in FIG. 37B by the rotation of the rotation member 105, the space S3 is pressurized by the flat plate member 103 and the film 102 expands.

Further, in the state in which the active valve 109 is opened, even when the flat plate member 103 moves from the second position shown in FIG. 38A to the first position shown in FIG. 38B by the rotation of the rotation member 105, the film 102 does not expand. In this way, the haptic sensation presenting device 100 is capable of presenting various haptic sensations even in the case where the haptic sensation presenting device 100 includes only the flat plate member 103.

Figure 39:
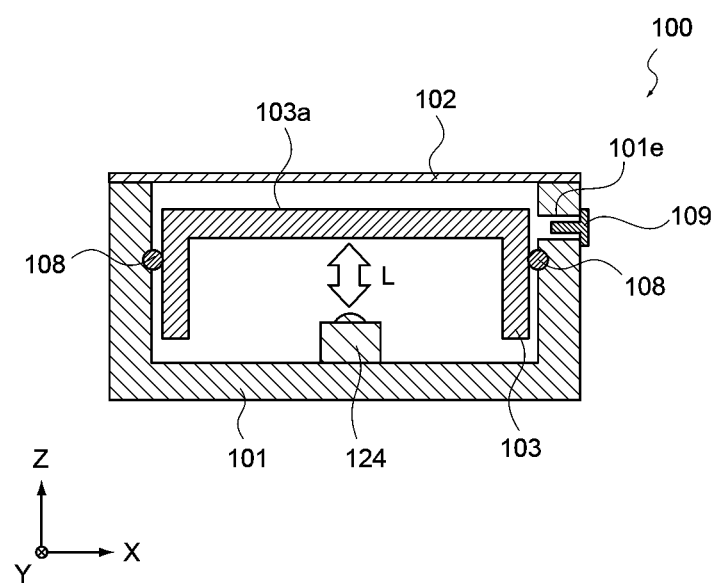
FIG. 39 is a schematic diagram showing a sensor included in the haptic sensation presenting device.

Note that also in this configuration, in the case where it is necessary to acquire the accurate position of the flat plate member 103, a sensor can be used. FIG. 39 is a schematic diagram showing the haptic sensation presenting device 100 that includes a sensor 124. In this configuration, since only the flat plate member 103 moves, a distance L between the sensor 124 and the flat plate member 103 can be acquired by the sensor 124 and the acquired distance L can be used for controlling the motor driving the rotation member 105.

Figure 40:
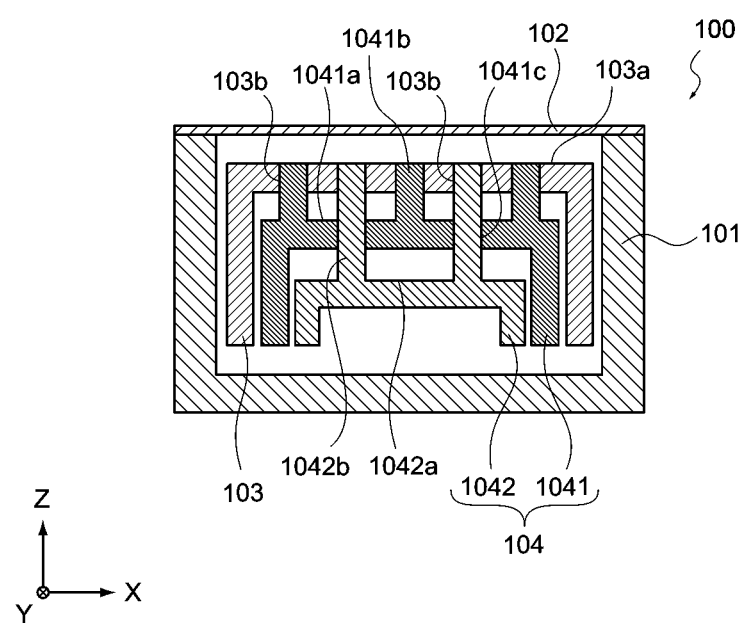
FIG. 40 is a schematic cross-sectional view of a haptic sensation presenting device according to a second modified example of the present technology.

FIG. 40 is a schematic diagram showing the haptic sensation presenting device 100 according to a second modified example. As shown in the figure, the haptic sensation presenting device 100 can include two recessed and projecting members 104, and the two recessed and projecting members 104 are defined as a first recessed and projecting member 1041 and a second recessed and projecting member 1042.

As shown in FIG. 40, the first recessed and projecting member 1041 is disposed inside the flat plate member 103 and includes a support surface 1041a, a protruding portion 1041b, and a through hole 1041c. The support surface 1041a is a surface parallel to the X-Y plane. The protruding portion 1041b is a rod-shaped portion protruding from the support surface 1041a in the Z direction and includes a plurality of protruding portions. As shown in FIG. 40, the protruding portion 1041b is inserted into part of the through holes 103b. The through hole 1041c is a through hole provided on the support surface 1041a.

As shown in FIG. 40, the second recessed and projecting member 1042 is disposed inside the first recessed and projecting member 1041 and includes a support surface 1042a and a protruding portion 1042b. The support surface 1042a is a surface parallel to the X-Y plane. The protruding portion 1042b is a rod-shaped portion protruding from the support surface 1042a in the Z direction and includes a plurality of protruding portions. As shown in FIG. 40, the protruding portion 1042b is inserted into the through hole 1041c and further into the through hole 103b. Note that the protruding portion 1042b may have a thickness and a tip shape different from those of the protruding portion 1041b.

The flat plate member 103, the first recessed and projecting member 1041, and the second recessed and projecting member 1042 abut on the rotation member 105 (not shown) and are configured to be capable of independently moving in the Z direction by the rotation of the rotation member 105 by a mechanism (see FIGS. 21A, 21B, and 21C) that moves by an inclined portion provided in the rotation member 105.

Figure 41A:
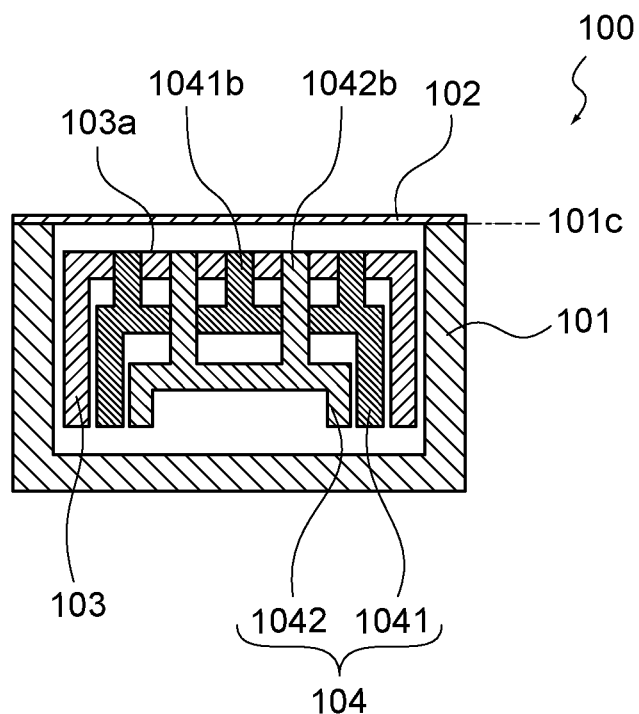
FIGS. 41A and 41B are schematic cross-sectional views showing an operation of the haptic sensation presenting device.
Figure 41B:
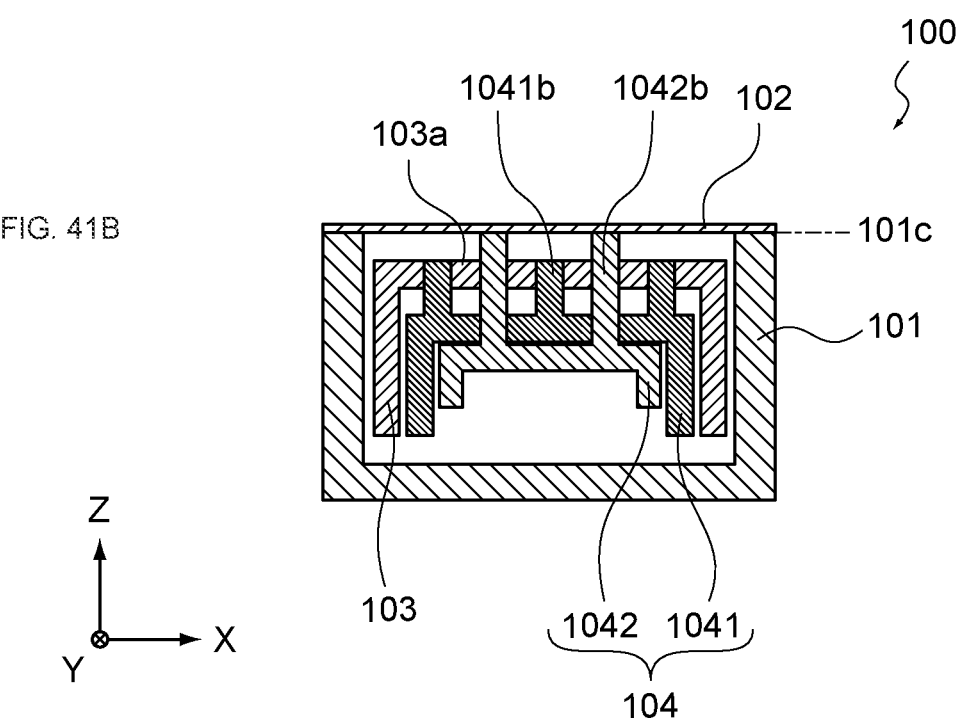

FIGS. 41A, 41B, 42A, and 42B are each a schematic diagram showing the operation of this haptic sensation presenting device 100. As shown in FIG. 41A, the flat plate member 103, the first recessed and projecting member 1041, and the second recessed and projecting member 1042 are located at positions separated from the opening surface 101c. When the rotation member 105 rotates from this position, the second recessed and projecting member 1042 moves in the Z direction as shown in FIG. 41B and moves to the position at which the tips of the protruding portion 1042b match the opening surface 101c.

Figure 42A:
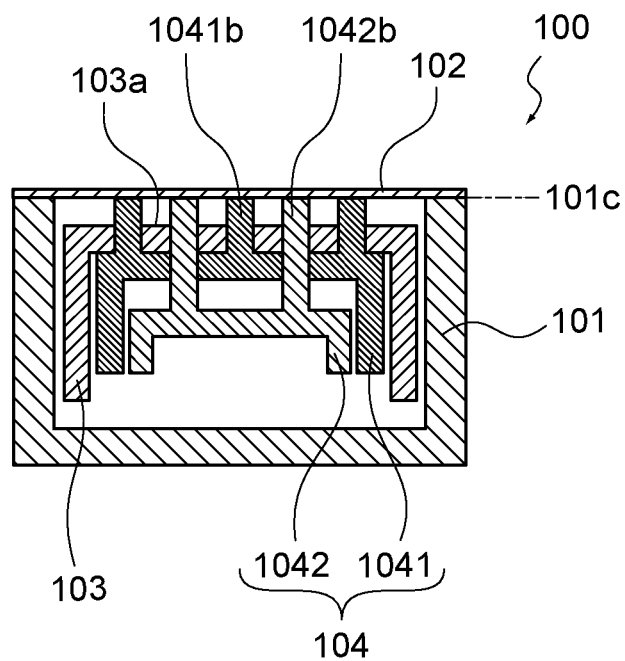
FIGS. 42A and 42B are schematic cross-sectional views showing an operation of the haptic sensation presenting device.
Figure 42B:
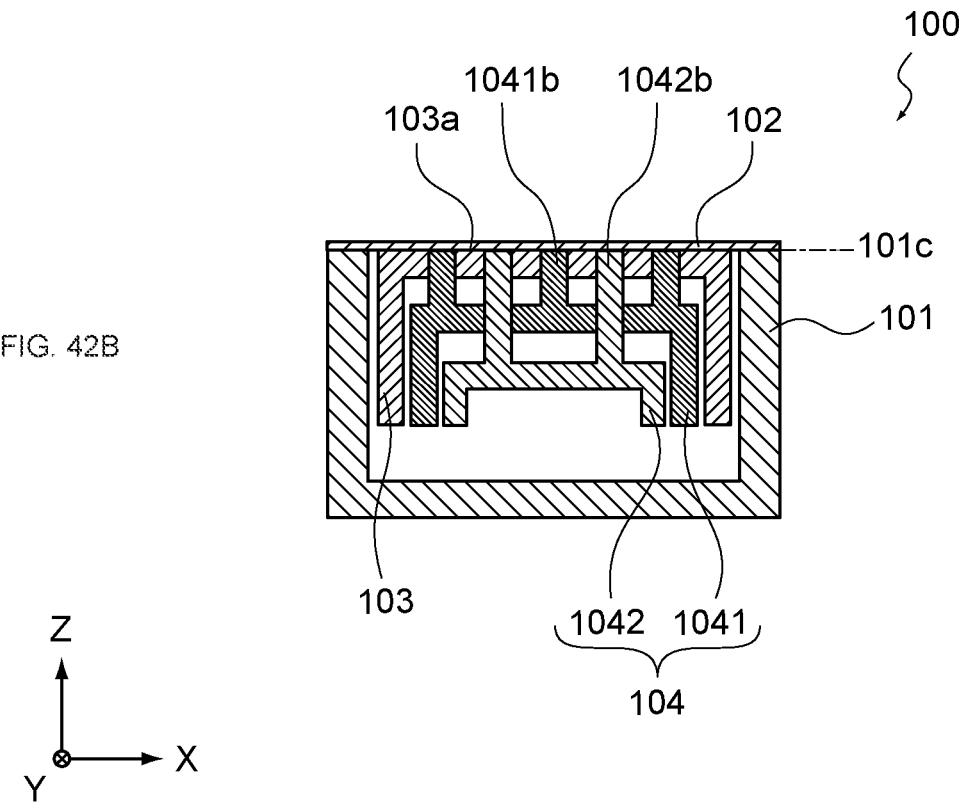

When the rotation member 105 further rotates, the first recessed and projecting member 1041 moves in the Z direction as shown in FIG. 42A and moves to the position at which the tips of the protruding portion 1041b match the opening surface 101c. When the rotation member 105 further rotates from that position, the flat plate member 103 moves in the Z direction as shown in FIG. 42B and moves to the position at which the main surface 103a matches the opening surface 101c.

By providing the flat plate member 103, the first recessed and projecting member 1041, and the second recessed and projecting member 1042 that are capable of independently moving and inserting the protruding portion 1041b and the protruding portion 1042b into the through holes 103b, it is possible to change the density of recessions and projections on the opening surface 101c. Note that also in this configuration, a piston ring and an active valve may be provided to expand the film 102 or the film 102 may be expanded by a pump.

Figure 43:
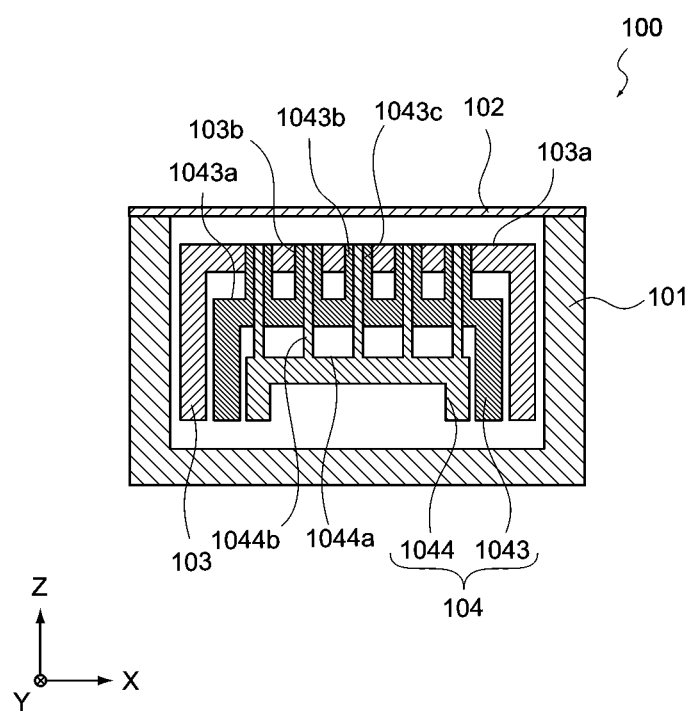
FIG. 43 is a schematic cross-sectional view showing a haptic sensation presenting device according to a third modified example of the present technology.

FIG. 43 is a schematic diagram showing the haptic sensation presenting device 100 according to a third modified example. As shown in the figure, the haptic sensation presenting device 100 can include two recessed and projecting members 104, and the two recessed and projecting members 104 are defined as a first recessed and projecting member 1043 and a second recessed and projecting member 1044.

As shown in FIG. 43, the first recessed and projecting member 1043 is disposed inside the flat plate member 103 and includes a support surface 1043a, a protruding portion 1043b, and a hole 1043c. The support surface 1043a is a surface parallel to the X-Y plane. The protruding portion 1043b is a rod-shaped portion protruding from the support surface 1043a in the Z direction and includes a plurality of protruding portions. As shown in FIG. 43, the protruding portion 1043b is inserted into the through hole 103b. The hole 1043c is a hole that is provided in the corresponding protruding portion 1043b and extends in the Z direction.

As shown in FIG. 43, the second recessed and projecting member 1044 is disposed inside the first recessed and projecting member 1043 and includes a support surface 1044a and a protruding portion 1044b. The support surface 1044a is a surface parallel to the X-Y plane. The protruding portion 1044b is a rod-shaped portion protruding from the support surface 1044a in the Z direction and includes a plurality of protruding portions. The protruding portion 1044b is formed in a shape thinner than the protruding portion 1043b and is inserted into the hole 1043c as shown in FIG. 43.

The flat plate member 103, the first recessed and projecting member 1043, and the second recessed and projecting member 1044 abut on the rotation member 105 (not shown) and are configured to be capable of independently moving in the Z direction by the rotation of the rotation member 105 by a mechanism (see FIGS. 21A, 21B, and 21C) that moves by an inclined portion provided in the rotation member 105.

FIGS. 44A, 44B, 45A, and 45B are each a schematic diagram showing the operation of this haptic sensation presenting device 100. As shown in FIG. 44A, the flat plate member 103, the first recessed and projecting member 1043, and the second recessed and projecting member 1044 are located at positions separated from the opening surface 101c. When the rotation member 105 rotates from this position, the second recessed and projecting member 1044 moves in the Z direction as shown in FIG. 44B and moves to the position at which the tips of the protruding portion 1044b match the opening surface 101c.

When the rotation member 105 further rotates, the first recessed and projecting member 1043 moves in the Z direction as shown in FIG. 45A and moves to the position at which the tips of the protruding portion 1043b match the opening surface 101c. When the rotation member 105 further rotates from that position, the flat plate member 103 moves in the Z direction as shown in FIG. 45B and moves to the position at which the main surface 103a matches the opening surface 101c.

By providing the flat plate member 103, the first recessed and projecting member 1043, and the second recessed and projecting member 1044 that are capable of independently moving and inserting the protruding portion 1044b into the protruding portion 1043b, it is possible to change the texture of the recessions and projections on the opening surface 101c. Note that also in this configuration, a piston ring and an active valve may be provided to expand the film 102 or the film 102 may be expanded by a pump.

How to Use Haptic Sensation Presenting Device

The haptic sensation presenting device 100 according to this embodiment can be used for various purposes of presenting a haptic sensation to a user, such as a game controller, an operation panel of an automobile, and a remote controller capable of performing a blind operation.

Regarding Holding Device

Figure 46:
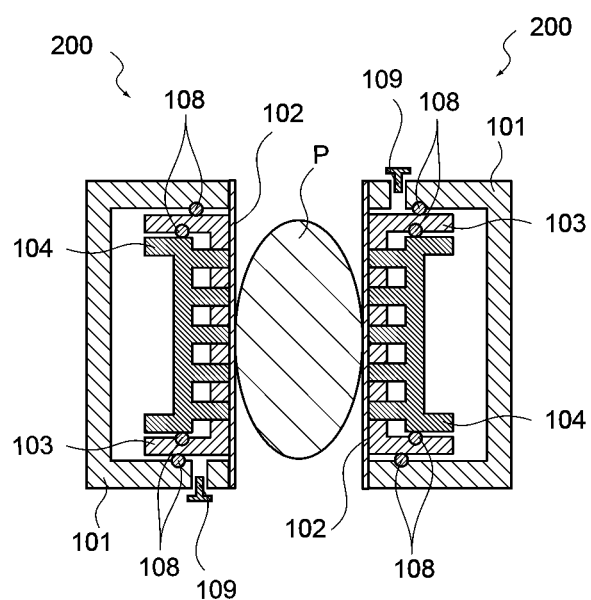
FIG. 46 is a schematic cross-sectional view of a holding device according to an embodiment of the present technology.

The structure of the haptic sensation presenting device 100 according to the present technology can be used for a holding device for holding an object. FIG. 46 is a schematic diagram showing a holding device 200 according to the present technology. As shown in the figure, an object P can be held by a pair of holding devices 200. The holding device 200 has a configuration similar to that of the haptic sensation presenting device 100 and is mounted on, for example, the finger pad of a robot arm.

Figure 47:
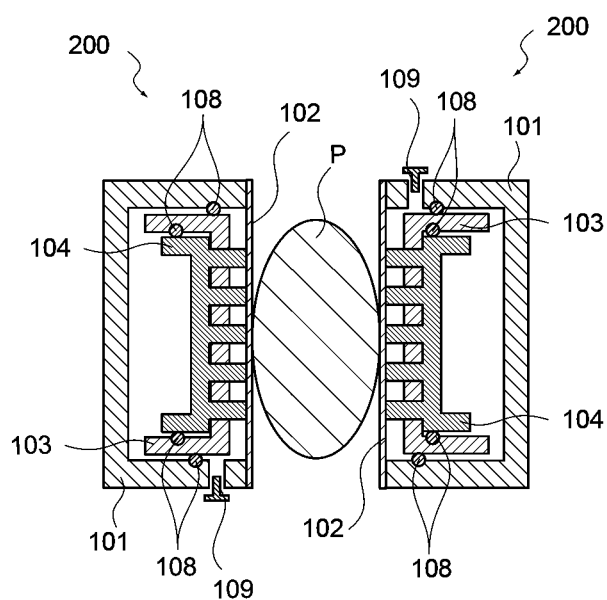
FIG. 47 is a schematic cross-sectional view of the holding device.

In FIG. 46, the holding device 200 is in the above-mentioned third state, the flat plate member 103 and the recessed and projecting member 104 abut on the film 102, and the object P can be held by the hard surface. FIG. 47 is a schematic diagram showing another state of the holding device 200. As shown in the figure, the holding device 200 is in the above-mentioned second state, only the recessed and projecting member 104 abuts on the film 102, and the object P can be held by also the recessed and projected surface. This is particularly effective in the case where the object P is a slippery object or the like.

Figure 48:
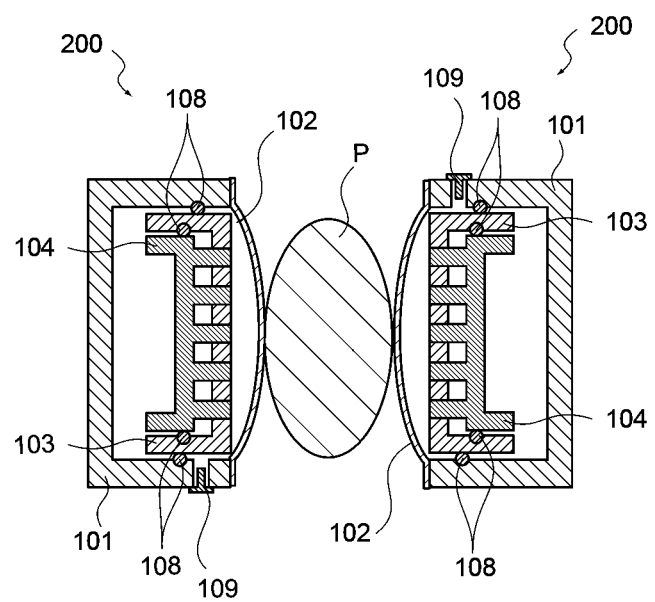
FIG. 48 is a schematic cross-sectional view of the holding device.

FIG. 48 is a schematic diagram showing still another state of the holding device 200. As shown in the figure, the holding device 200 is in the above-mentioned fourth state, the film 102 is expanded, and the object P can be held by only the film 102. This is particularly effective in the case where the object P is a fragile object or the like.

As described above, the holding device 200 is capable of changing the state of the holding surface in accordance with the property of the object P to be held and can have high holding performance. Note that the configuration of the holding device 200 is not limited to those shown in FIG. 46 to FIG. 48, and may be any configuration in the present disclosure.

Note that the present technology may also take the following configurations.

(1) A haptic sensation presenting device, including:
   a casing that has an opening;
   a film that closes the opening; and
   a flat plate member that has a main surface parallel to an opening surface of the opening, and is supported by the casing so as to be movable between a first position at which the main surface is located on the same surface as the opening surface and a second position at which the main surface is separated from the opening surface in a direction opposite to the film.

(2) The haptic sensation presenting device according to (1) above, in which
   the flat plate member includes a plurality of through holes provided on the main surface, the haptic sensation presenting device further including
   a recessed and projecting member that includes a plurality of protruding portions to be inserted from a side opposite to the film into the plurality of through holes and is supported by the casing so as to be movable relative to the casing independently of the flat plate member.

(3) The haptic sensation presenting device according to (2) above, in which
   the recessed and projecting member is movable between a third position at which tips of the plurality of protruding portions are located on the same surface as the opening surface and a fourth position at which the tips of the plurality of protruding portions are separated from the opening surface in a direction opposite to the film.

(4) The haptic sensation presenting device according to (3) above, which takes a first state in which the flat plate member is located at the second position and the recessed and projecting member is located at the fourth position, a second state in which the flat plate member is located at the second position and the recessed and projecting member is located at the third position, and a third state in which the flat plate member is located at the first position and the recessed and projecting member is located at the third position.

(5) The haptic sensation presenting device according to (4) above, further including
an annular rotation member that is rotatably supported by the casing, has a direction perpendicular to the opening surface as a rotation axis direction, and independently moves, by rotating, the flat plate member and the recessed and projecting member in a direction perpendicular to the opening surface to form the first state, the second state, and the third state.

(6) The haptic sensation presenting device according to (5) above, in which
the flat plate member includes a cylindrical first side wall portion that extends in a direction perpendicular to the main surface from a peripheral edge of the main surface,
the recessed and projecting member includes a support surface that is disposed parallel to the main surface, the plurality of protruding portions being provided on the support surface, and a cylindrical second side wall portion that extends in a direction perpendicular to the support surface from a peripheral edge of the support surface and is located on an inner circumference of the first side wall portion, and
the rotation member rotates while abutting on the first side wall portion and the second side wall portion.

(7) The haptic sensation presenting device according to (6) above, in which
the first side wall portion includes a first inclined portion whose height from the main surface gradually increases,
the second side wall portion includes a second inclined portion whose height from the support surface gradually increase, and
the rotation member includes a third inclined portion that abuts on the first inclined portion by rotation of the rotation member to move the flat plate member and abuts on the second inclined portion by rotation of the rotation member to move the recessed and projecting member.

(8) The haptic sensation presenting device according to (7) above, in which
the first inclined portion and the second inclined portion are provided at different positions on a circumference of the rotation member as viewed from a direction perpendicular to the opening surface, and the third inclined portion abuts on only one of the first inclined portion and the second inclined portion in accordance with a rotation angle of the rotation member.

(9) The haptic sensation presenting device according to any one of (6) to (8) above, in which
the flat plate member includes a first protrusion that is provided on the first side wall portion, fits into a rail provided on the casing, guides movement of the flat plate member between the first position and the second position, and prevents the flat plate member from rotating, and
the recessed and projecting member includes a second protrusion that is provided on the second side wall portion, fits into a rail provided on the casing, guides movement of the recessed and projecting member between the third position and the fourth position, and prevents the recessed and projecting member from rotating.

(10) The haptic sensation presenting device according to (9) above, further including:
a first spring that is provided between the first protrusion and the casing, is compressed when the flat plate member moves from the second position to the first position by rotation of the rotation member, and moves the flat plate member from the first position to the second position when the rotation member further rotates; and
a second spring that is provided between the second protrusion and the casing, is compressed when the recessed and projecting member moves from the fourth position to the third position by rotation of the rotation member, and moves the recessed and projecting member from the third position to the fourth position when the rotation member further rotates.

(11) The haptic sensation presenting device according to any one of (6) to (10) above, in which
the rotation member includes a plurality of recessions and projections on an inner circumference side, the haptic sensation presenting device further including:
a sensor that measures the number of times that the plurality of recessions and projections have passed by rotation of the rotation member;
a motor that causes the rotation member to rotate; and a control unit that controls rotation of the motor on a basis of an output of the sensor.

(12) The haptic sensation presenting device according to any one of (6) to (10) above, further including:
a motor that causes the rotation member to rotate; and
a control unit that controls rotation of the motor, in which
the control unit causes the motor to rotate in a continuous manner to vibrate the flat plate member and the recessed and projecting member.

(13) The haptic sensation presenting device according to (12) above, in which
the control unit dynamically changes vibration frequencies of the flat plate member and the recessed and projecting member by changing a rotation speed of the motor.

(14) The haptic sensation presenting device according to any one of (2) to (13) above, in which
the film has stretchability, the haptic sensation presenting device further including
a pump that pressurizes an inside of the casing and expands the film.

(15) The haptic sensation presenting device according to any one of (2) to (13) above, in which
the film has stretchability, the haptic sensation presenting device further including
a piston ring that seals a space between the film, the casing, the flat plate member, and the recessed and projecting member, in which
the film is expanded by movement of the flat plate member and the recessed and projecting member.

(16) The haptic sensation presenting device according to (15) above, further including
an active valve that is capable of exhausting the space, in which
whether or not to expand the film by movement of the flat plate member and the recessed and projecting member is switched by opening and closing of the active valve.

(17) The haptic sensation presenting device according to any one of (4) to (13) above, in which
the film has stretchability and is located on the opening surface in the first state, the second state, and the third state, the haptic sensation presenting device further taking a fourth state in which the film is expanded.

(18) The haptic sensation presenting device according to any one of (1) to (13) above, in which
the film has stretchability, the haptic sensation presenting device further including
a piston ring that seals a space between the film, the casing, and the flat plate member, in which
the film is expanded by movement of the flat plate member.

(19) The haptic sensation presenting device according to (18) above, which takes a first state in which the flat plate member is located at the first position and the film is located on the opening surface, a second state in which the flat plate member is located at the second position and the film is located on the opening surface, and a third state in which the film is expanded.

(20) A holding device, including:
a casing that has an opening;
a film that closes the opening; and
a flat plate member that has a main surface parallel to an opening surface of the opening, and is supported by the casing so as to be movable between a first position at which the main surface is located on the same surface as the opening surface and a second position at which the main surface is separated from the opening surface in a direction opposite to the film.

(21) The holding device according to (20) above, in which
the flat plate member includes a plurality of through holes provided on the main surface, the haptic sensation presenting device further including
a recessed and projecting member that includes a plurality of protruding portions to be inserted from a side opposite to the film into the plurality of through holes and is supported by the casing so as to be movable relative to the casing independently of the flat plate member.

(22) The holding device according to (21) above, in which
the recessed and projecting member is movable between a third position at which tips of the plurality of protruding portions are located on the same surface as the opening surface and a fourth position at which the tips of the plurality of protruding portions are separated from the opening surface in a direction opposite to the film.

(23) The holding device according to (22) above, which takes a first state in which the flat plate member is located at the second position and the recessed and projecting member is located at the fourth position, a second state in which the flat plate member is located at the second position and the recessed and projecting member is located at the third position, and a third state in which the flat plate member is located at the first position and the recessed and projecting member is located at the third position.

(24) The holding device according to (23) above, further including
an annular rotation member that is rotatably supported by the casing, has a direction perpendicular to the opening surface as a rotation axis direction, and independently moves, by rotating, the flat plate member and the recessed and projecting member in a direction perpendicular to the opening surface to form the first state, the second state, and the third state.

(25) The holding device according to (24) above, in which
the flat plate member includes a cylindrical first side wall portion that extends in a direction perpendicular to the main surface from a peripheral edge of the main surface,
the recessed and projecting member includes a support surface that is disposed parallel to the main surface, the plurality of protruding portions being provided on the support surface, and a cylindrical second side wall portion that extends in a direction perpendicular to the support surface from a peripheral edge of the support surface and is located on an inner circumference of the first side wall portion, and
the rotation member rotates while abutting on the first side wall portion and the second side wall portion.

(26) The holding device according to (25) above, in which
the first side wall portion includes a first inclined portion whose height from the main surface gradually increases,
the second side wall portion includes a second inclined portion whose height from the support surface gradually increase, and
the rotation member includes a third inclined portion that abuts on the first inclined portion by rotation of the rotation member to move the flat plate member and abuts on the second inclined portion by rotation of the rotation member to move the recessed and projecting member.

(27) The holding device according to (26) above, in which
the first inclined portion and the second inclined portion are provided at different positions on a circumference of the rotation member as viewed from a direction perpendicular to the opening surface, and the third inclined portion abuts on only one of the first inclined portion and the second inclined portion in accordance with a rotation angle of the rotation member.

(28) The holding device according to any one of (25) to (27) above, in which
the flat plate member includes a first protrusion that is provided on the first side wall portion, fits into a rail provided on the casing, guides movement of the flat plate member between the first position and the second position, and prevents the flat plate member from rotating, and
the recessed and projecting member includes a second protrusion that is provided on the second side wall portion, fits into a rail provided on the casing, guides movement of the recessed and projecting member between the third position and the fourth position, and prevents the recessed and projecting member from rotating.

(29) The holding device according to (28) above, further including:
a first spring that is provided between the first protrusion and the casing, is compressed when the flat plate member moves from the second position to the first position by rotation of the rotation member, and moves the flat plate member from the first position to the second position when the rotation member further rotates; and
a second spring that is provided between the second protrusion and the casing, is compressed when the recessed and projecting member moves from the fourth position to the third position by rotation of the rotation member, and moves the recessed and projecting member from the third position to the fourth position when the rotation member further rotates.

(30) The holding device according to any one of (25) to (29) above, in which
the rotation member includes a plurality of recessions and projections on an inner circumference side, the haptic sensation presenting device further including:
a sensor that measures the number of times that the plurality of recessions and projections have passed by rotation of the rotation member;
a motor that causes the rotation member to rotate; and
a control unit that controls rotation of the motor on a basis of an output of the sensor.
(31) The holding device according to any one of (25) to (29) above, further including:
a motor that causes the rotation member to rotate; and
a control unit that controls rotation of the motor, in which
the control unit causes the motor to rotate in a continuous manner to vibrate the flat plate member and the recessed and projecting member.
(32) The holding device according to (31) above, in which
the control unit dynamically changes vibration frequencies of the flat plate member and the recessed and projecting member by changing a rotation speed of the motor.
(33) The holding device according to any one of (21) to (32) above, in which
the film has stretchability, the haptic sensation presenting device further including
a pump that pressurizes an inside of the casing and expands the film.
(34) The holding device according to any one of (21) to (32) above, in which
the film has stretchability, the haptic sensation presenting device further including
a piston ring that seals a space between the film, the casing, the flat plate member, and the recessed and projecting member, in which
the film is expanded by movement of the flat plate member and the recessed and projecting member.
(35) The holding device according to (34) above, further including
an active valve that is capable of exhausting the space, in which
whether or not to expand the film by movement of the flat plate member and the recessed and projecting member is switched by opening and closing of the active valve.
(36) The holding device according to any one of (23) to (32) above, in which
the film has stretchability and is located on the opening surface in the first state, the second state, and the third state,
the haptic sensation presenting device further taking a fourth state in which the film is expanded.
(37) The holding device according to any one of (20) to (32) above, in which
the film has stretchability, the haptic sensation presenting device further including
a piston ring that seals a space between the film, the casing, and the flat plate member, in which
the film is expanded by movement of the flat plate member.
(38) The holding device according to (37) above, which takes a first state in which the flat plate member is located at the first position and the film is located on the opening surface, a second state in which the flat plate member is located at the second position and the film is located on the opening surface, and a third state in which the film is expanded.

REFERENCE SIGNS LIST 100 haptic sensation presenting device
101 casing
102 film
103 flat plate member
104 recessed and projecting member
105 rotation member
106 spring
107 spring
108 piston ring
109 active valve
110 pump
121 motor
122 control unit
123 sensor
124 sensor
200 holding device

The invention claimed is:
1. A haptic sensation presenting device, comprising:
a casing that has an opening;
a film that closes the opening; and
a flat plate member that has a main surface parallel to an opening surface of the opening, and is supported by the casing so as to be movable between a first position at which the main surface is located on a same surface as the opening surface and a second position at which the main surface is separated from the opening surface in the direction opposite to the film.
2. The haptic sensation presenting device according to claim 1, wherein
the flat plate member includes a plurality of through holes provided on the main surface, the haptic sensation presenting device further comprising
a recessed and projecting member that includes a plurality of protruding portions to be inserted from a side opposite to the film into the plurality of through holes and is supported by the casing so as to be movable relative to the casing independently of the flat plate member.
3. The haptic sensation presenting device according to claim 2, wherein
the recessed and projecting member is movable between a third position at which tips of the plurality of protruding portions are located on the same surface as the opening surface and a fourth position at which the tips of the plurality of protruding portions are separated from the opening surface in a direction opposite to the film.
4. The haptic sensation presenting device according to claim 3, wherein the haptic sensation presenting device at a first state in which the flat plate member is located at the second position and the recessed and projecting member is located at the fourth position, a second state in which the flat plate member is located at the second position and the recessed and projecting member is located at the third position, and a third state in which the flat plate member is located at the first position and the recessed and projecting member is located at the third position.
5. The haptic sensation presenting device according to claim 4, further comprising
an annular rotation member that is rotatably supported by the casing, has a direction perpendicular to the opening surface as a rotation axis direction, and independently moves, by rotating, the flat plate member and the recessed and projecting member in a direction perpen- dicular to the opening surface to form the first state, the second state, and the third state.

6. The haptic sensation presenting device according to claim 5, wherein
the flat plate member includes a cylindrical first side wall portion that extends in a direction perpendicular to the main surface from a peripheral edge of the main surface,
the recessed and projecting member includes a support surface that is disposed parallel to the main surface, the plurality of protruding portions being provided on the support surface,
a cylindrical second side wall portion that extends in a direction perpendicular to the support surface from a peripheral edge of the support surface and is located on an inner circumference of the cylindrical first side wall portion, and
the annual rotation member rotates while abutting on the cylindrical first side wall portion and the cylindrical second side wall portion.

7. The haptic sensation presenting device according to claim 6, wherein
the cylindrical first side wall portion includes a first inclined portion whose height from the main surface gradually increases,
the cylindrical second side wall portion includes a second inclined portion whose height from the support surface gradually increase, and
the rotation member includes a third inclined portion that abuts on the first inclined portion by the rotation of the rotation member to move the flat plate member and abuts on the second inclined portion by the rotation of the rotation member to move the recessed and projecting member.

8. The haptic sensation presenting device according to claim 7, wherein
the first inclined portion and the second inclined portion are provided at different positions on a circumference of the rotation member as viewed from the direction perpendicular to the opening surface, and the third inclined portion abuts on only one of the first inclined portion and the second inclined portion in accordance with a rotation angle of the rotation member.

9. The haptic sensation presenting device according to claim 6, wherein
the flat plate member includes a first protrusion that is provided on the first side wall portion, fits into a rail provided on the casing, guides movement of the flat plate member between the first position and the second position, and prevents the flat plate member from rotating, and
the recessed and projecting member includes a second protrusion that is provided on the cylindrical second side wall portion, fits into the rail provided on the casing, guides movement of the recessed and projecting member between the third position and the fourth position, and prevents the recessed and projecting member from rotating.

10. The haptic sensation presenting device according to claim 9, further comprising:
a first spring that is provided between the first protrusion and the casing, is compressed when the flat plate member moves from the second position to the first position by the rotation of the rotation member, and moves the flat plate member from the first position to the second position when the rotation member further rotates; and
a second spring that is provided between the second protrusion and the casing, is compressed when the recessed and projecting member moves from the fourth position to the third position by the rotation of the rotation member, and moves the recessed and projecting member from the third position to the fourth position when the rotation member further rotates.

11. The haptic sensation presenting device according to claim 6, wherein
the rotation member includes a plurality of recessions and projections on an inner circumference side, the haptic sensation presenting device further comprising:
a sensor that measures a number of times that the plurality of recessions and projections have passed by the rotation of the rotation member;
a motor that causes the rotation member to rotate; and
a control unit that controls rotation of the motor on a basis of an output of the sensor.

12. The haptic sensation presenting device according to claim 6, further comprising:
a motor that causes the rotation member to rotate; and
a control unit that controls rotation of the motor, wherein
the control unit causes the motor to rotate in a continuous manner to vibrate the flat plate member and the recessed and projecting member.

13. The haptic sensation presenting device according to claim 12, wherein
the control unit dynamically changes vibration frequencies of the flat plate member and the recessed and projecting member by changing a rotation speed of the motor.

14. The haptic sensation presenting device according to claim 2, wherein
the film has stretchability, the haptic sensation presenting device further comprising
a pump that pressurizes an inside of the casing and expands the film.

15. The haptic sensation presenting device according to claim 2, wherein
the film has stretchability, the haptic sensation presenting device further comprising
a piston ring that seals a space between the film, the casing, the flat plate member, and the recessed and projecting member, wherein
the film is expanded by movement of the flat plate member and the recessed and projecting member.

16. The haptic sensation presenting device according to claim 15, further comprising
an active valve that is capable of exhausting the space, wherein
whether or not to expand the film by the movement of the flat plate member and the recessed and projecting member is switched by opening and closing of the active valve.

17. The haptic sensation presenting device according to claim 4, wherein
the film has stretchability and is located on the opening surface in the first state, the second state, and the third state,
the haptic sensation presenting device further taking a fourth state in which the film is expanded.

18. The haptic sensation presenting device according to claim 1, wherein
the film has stretchability, the haptic sensation presenting device further comprising
a piston ring that seals a space between the film, the casing, and the flat plate member, wherein the film is expanded by movement of the flat plate member.

19. The haptic sensation presenting device according to claim 18, wherein the haptic sensation presenting device at a first state in which the flat plate member is located at the first position and the film is located on the opening surface, a second state in which the flat plate member is located at the second position and the film is located on the opening surface, and a third state in which the film is expanded.

20. A holding device, comprising:
   a casing that has an opening;
   a film that closes the opening; and
   a flat plate member that has a main surface parallel to an opening surface of the opening, and is supported by the casing so as to be movable between a first position at which the main surface is located on the same surface as the opening surface and a second position at which the main surface is separated from the opening surface in a direction opposite to the film.

\* \* \* \* \*